United States Patent
Taghavi Nasrabadi et al.

(10) Patent No.: US 9,130,812 B2
(45) Date of Patent: Sep. 8, 2015

(54) SYSTEMS AND METHODS FOR WIRELESS COMMUNICATION IN SUB GIGAHERTZ BANDS

(71) Applicant: QUALCOMM Incorporated, San Diego, CA (US)

(72) Inventors: Mohammad Hossein Taghavi Nasrabadi, San Diego, CA (US); Sameer Vermani, San Diego, CA (US); Lin Yang, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/875,638

(22) Filed: May 2, 2013

(65) Prior Publication Data

US 2013/0243115 A1  Sep. 19, 2013

Related U.S. Application Data

(63) Continuation of application No. 13/410,633, filed on Mar. 2, 2012, now Pat. No. 8,625,690.

(60) Provisional application No. 61/449,582, filed on Mar. 4, 2011, provisional application No. 61/471,173, filed on Apr. 3, 2011.

(51) Int. Cl.
*H04L 27/06* (2006.01)
*H04L 27/26* (2006.01)
*H04L 5/00* (2006.01)

(52) U.S. Cl.
CPC ........ *H04L 27/2628* (2013.01); *H04L 27/2613* (2013.01); *H04L 27/2647* (2013.01); *H04L 5/0023* (2013.01); *H04L 5/0053* (2013.01)

(58) Field of Classification Search
CPC ............ H04L 27/2628; H04L 27/2602; H04L 5/0053

USPC ......... 375/260, 295, 316, 340; 370/210, 344, 370/480

See application file for complete search history.

(56) References Cited

U.S. PATENT DOCUMENTS

2008/0151822 A1  6/2008  Hansen et al.
2009/0034526 A1  2/2009  Ahmadi et al.
(Continued)

FOREIGN PATENT DOCUMENTS

JP  2007536835 A  12/2007
JP  2010098339 A  4/2010
(Continued)

OTHER PUBLICATIONS

International Search Report and Written Opinion—PCT/US2012/027762—ISA/EPO—May 22, 2012.
(Continued)

*Primary Examiner* — Leon Flores
(74) *Attorney, Agent, or Firm* — James O'Hare; Michael R. Harris

(57) ABSTRACT

Systems, methods, and devices for wireless communication. In one aspect, an apparatus for wireless communication is provided. The apparatus includes a receiver configured to receive a wireless signal comprising a packet. At least a portion of the wireless signal is configured to be received over a bandwidth lower than or equal to 1.25 MHz. The packet is formed from at least one orthogonal frequency-division multiplexing (OFDM) symbol comprising thirty-two tones. The thirty-two tones correspond to frequency subcarriers within the bandwidth. The thirty-two tones of the at least one OFDM symbol are allocated as: twenty-four data tones, two pilot tones, five guard tones, and one direct current (DC) tone. The apparatus includes a processor configured to evaluate the wireless signal. The processor includes a transform module configured to convert the at least one OFDM symbol into a frequency domain signal using a thirty-two point mode.

56 Claims, 12 Drawing Sheets

(56) References Cited

U.S. PATENT DOCUMENTS

| | | |
|---|---|---|
| 2009/0225727 A1 | 9/2009 | Chen |
| 2010/0091673 A1 | 4/2010 | Sawai et al. |
| 2011/0051845 A1 | 3/2011 | Schmidl et al. |
| 2011/0116565 A1 | 5/2011 | Mujtaba |
| 2011/0182241 A1 | 7/2011 | Hansen et al. |
| 2011/0194545 A1 | 8/2011 | Yang et al. |
| 2011/0317779 A1 | 12/2011 | Schmidl et al. |
| 2012/0195391 A1* | 8/2012 | Zhang et al. .................. 375/295 |
| 2012/0201316 A1* | 8/2012 | Zhang et al. .................. 375/260 |
| 2012/0236971 A1 | 9/2012 | Taghavi Nasrabadi et al. |

FOREIGN PATENT DOCUMENTS

| | | |
|---|---|---|
| WO | WO-2005/112319 A2 | 11/2005 |
| WO | WO-2011/014685 A2 | 2/2011 |
| WO | WO-2012/103363 A1 | 8/2012 |

OTHER PUBLICATIONS

Porat R., et al., "Introductory TGah Proposal", IEEE 802.11-11/0069rl, Jan. 16, 2011, pp. 1-12, XP002675586, Retrieved from the Internet: URL:https://mentor.ieee.org/802.11/dcn/11/11-11-0069-01-00ah-tgah-introductory-proposal.ppt [retrieved on May 9, 2012].

Stacey R., et al., "Proposed TGac Draft Amendment", IEEE802.11-10/1361rl, Nov. 8, 2010, pp. 1-130, XP002675587, Retrieved from the Internet: URL:https://mentor.ieee.org/802.11/dcn/10/11-10-1361-02-00ac-proposed-tgac-draft-amendment.docx [retrieved on May 9, 2012] p. 64, line 8-line 9 p. 66, line 5-line 6 paragraph [22.3.9.2.3] p. 80, line 2.

Stacey R., "Proposed Tgac Draft Amendment; 11-10-1361-03-00ac-Proposed-Tgac-DraftAmendment", IEEE SA mentor; 11-10-1361-03-00ac-proposed-tgac-draft-amendment, 20110119 IEEE-SA mentors, Piscataway, NJ USA, vol. 802.11ac, Nr:3, pp. 1-154, XP068035312.

* cited by examiner

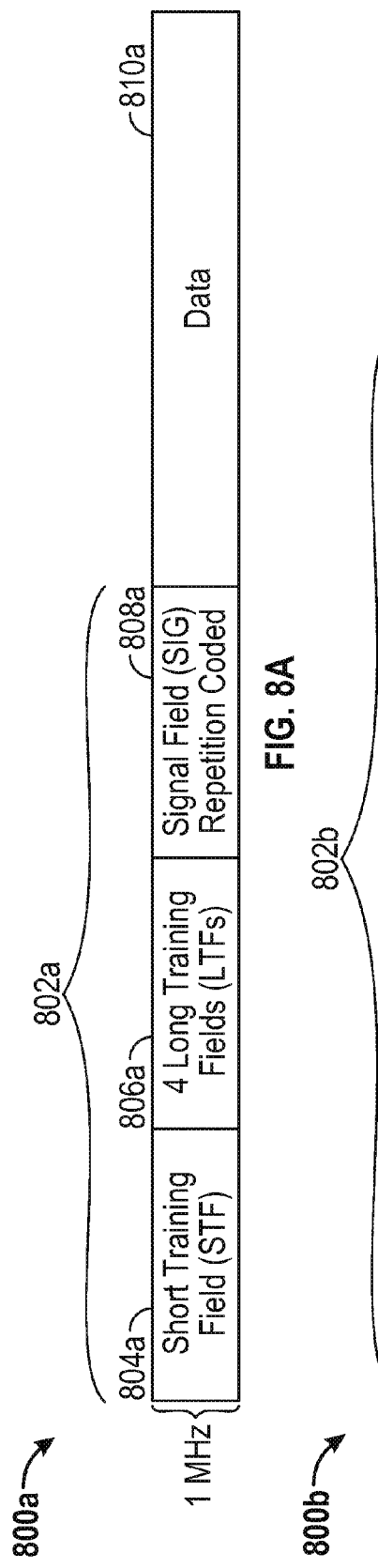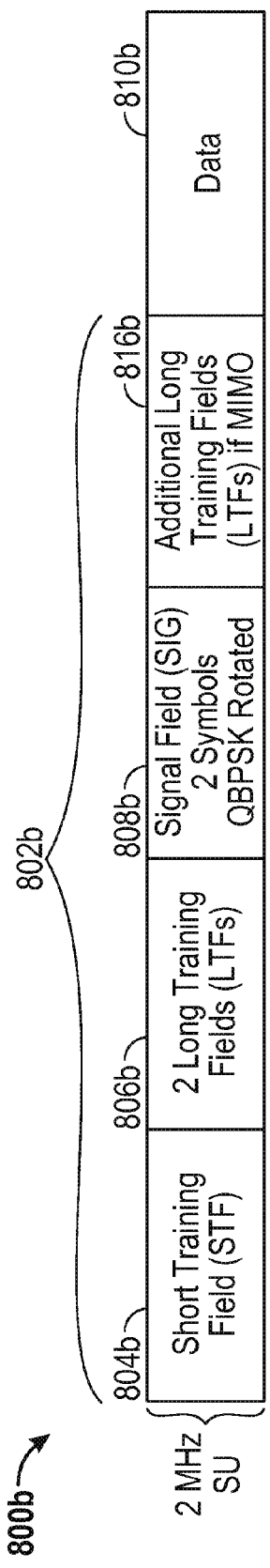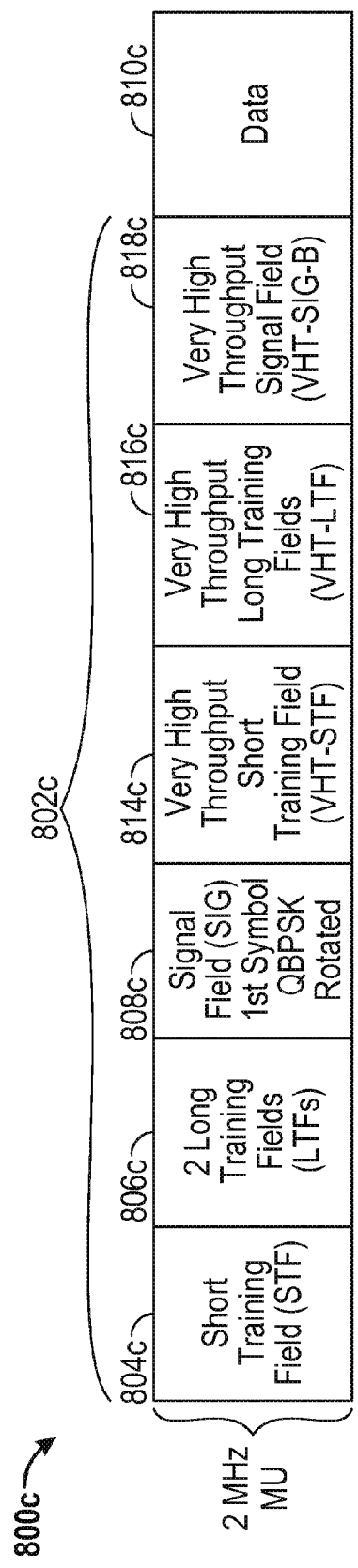

SYSTEMS AND METHODS FOR WIRELESS COMMUNICATION IN SUB GIGAHERTZ BANDS

CROSS REFERENCE TO RELATED APPLICATIONS

This application is a continuation of U.S. patent application Ser. No. 13/410,633, filed on Mar. 2, 2012 which claims priority and benefit under 35 U.S.C. §119(e) to U.S. Provisional Patent Application No. 61/449,582 entitled "SYSTEMS AND METHODS FOR WIRELESS COMMUNICATION IN SUB-GIGAHERTZ BANDS" filed on Mar. 4, 2011, the disclosure of which is hereby incorporated by reference in its entirety. U.S. patent application Ser. No. 13/410,633 additionally claims benefit under 35 U.S.C. §119(e) to U.S. Provisional Patent Application No. 61/471,173 entitled "SYSTEMS AND METHODS FOR SIGNALING IN A WIRELESS NETWORK" filed on Apr. 3, 2011, the disclosure of which is hereby incorporated by reference in its entirety.

BACKGROUND

1. Field

The present application relates generally to wireless communications, and more specifically to systems, methods, and devices to enable wireless communication in sub-gigahertz bands. Certain aspects herein relate to orthogonal frequency-division multiplexing (OFDM) communications that are sent using 32 tones over a bandwidth of equal to or less than 1.25 MHz.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides a wireless communications apparatus. The apparatus includes a receiver configured to receive a wireless signal including a packet. At least a portion of the wireless signal is received over a bandwidth lower than or equal to 1.25 MHz. The packet is formed from at least one orthogonal frequency-division multiplexing (OFDM) symbol including thirty-two tones. The thirty-two tones correspond to frequency subcarriers within the bandwidth. The thirty-two tones of the at least one OFDM symbol are allocated as: twenty-four data tones, two pilot tones, five guard tones, and one direct current (DC) tone. The apparatus includes a processor configured to evaluate the wireless signal. The processor includes a transform module configured to convert the at least one OFDM symbol into a frequency domain signal using a thirty-two point mode.

Another aspect of the disclosure provides an implementation of a method for wireless communication. The method includes receiving a wireless signal including a packet, at least a portion of the wireless signal being received over a bandwidth lower than or equal to 1.25 MHz. The packet is formed from at least one orthogonal frequency-division multiplexing (OFDM) symbol including thirty-two tones, the thirty-two tones corresponding to frequency subcarriers within the bandwidth. The thirty-two tones of the at least one OFDM symbol are allocated as: twenty-four data tones, two pilot tones, five guard tones, and one direct current (DC) tone. The method further includes evaluating the wireless signal, the evaluating including converting the at least one OFDM symbol into a frequency domain signal using a thirty-two point mode.

Yet another aspect of the disclosure provides an apparatus for wireless communication. The apparatus includes means for receiving a wireless signal including a packet, at least a portion of the wireless signal being received over a bandwidth lower than or equal to 1.25 MHz. The packet is formed from at least one orthogonal frequency-division multiplexing (OFDM) symbol including thirty-two tones, the thirty-two tones corresponding to frequency subcarriers within the bandwidth. The thirty-two tones of the at least one OFDM symbol are allocated as: twenty-four data tones, two pilot tones, five guard tones, and one direct current (DC) tone. The apparatus further includes means for evaluating the wireless signal, the means for evaluating further including means for converting the at least one OFDM symbol into a frequency domain signal using a thirty-two point mode.

Another aspect of the disclosure provides a computer program product. The computer program product includes a computer readable medium. The computer readable medium includes code for receiving a wireless signal including a packet, at least a portion of the wireless signal being received over a bandwidth lower than or equal to 1.25 MHz. The packet is formed from at least one orthogonal frequency-division multiplexing (OFDM) symbol including thirty-two tones, the thirty-two tones corresponding to frequency subcarriers within the bandwidth. The thirty-two tones of the at least one OFDM symbol are allocated as: twenty-four data tones, two pilot tones, five guard tones, and one direct current (DC) tone. The computer readable medium further includes code for evaluating the wireless signal, the code for evaluating including code for converting the at least one OFDM symbol into a frequency domain signal using a thirty-two point mode.

Another aspect of the disclosure provides an apparatus for wireless communication. The apparatus includes a processor configured to generate a packet for transmission via a wireless signal. The packet is generated for transmission using at least one orthogonal frequency-division multiplexing (OFDM) symbol including thirty-two tones, the thirty-two tones corresponding to frequency subcarriers. The thirty-two tones of the at least one OFDM symbol are allocated as: twenty-four data tones, two pilot tones, five guard tones, and one direct current (DC) tone. The apparatus further includes a transform module configured to convert the at least one OFDM symbol into a time domain signal using a thirty-two point mode. The apparatus further includes a transmitter configured to transmit the packet via the wireless signal over a bandwidth that is lower than or equal to 1.25 MHz.

Another aspect of the disclosure provides an implementation of a method for wireless communication. The method includes generating a packet for transmission via a wireless signal. The packet is generated for transmission using at least one orthogonal frequency-division multiplexing (OFDM) symbol including thirty-two tones, the thirty-two tones corresponding to frequency subcarriers. The thirty-two tones of the at least one OFDM symbol are allocated as: twenty-four data tones, two pilot tones, five guard tones, and one direct current (DC) tone. The method further includes converting the at least one OFDM symbol into a time domain signal using a thirty-two point mode. The method further includes transmitting the packet via the wireless signal over a bandwidth that is lower than or equal to 1.25 MHz.

Another aspect of the disclosure provides an apparatus for wireless communication. The apparatus includes means for generating a packet for transmission via a wireless signal. The packet is generated for transmission using at least one orthogonal frequency-division multiplexing (OFDM) symbol including thirty-two tones, the thirty-two tones corresponding to frequency subcarriers. The thirty-two tones of the at least one OFDM symbol are allocated as: twenty-four data tones, two pilot tones, five guard tones, and one direct current (DC) tone. The apparatus further includes means for converting the at least one OFDM symbol into a time domain signal using a thirty-two point mode. The apparatus further includes means for transmitting the packet via the wireless signal over a bandwidth that is lower than or equal to 1.25 MHz.

Another aspect of the disclosure provides a computer program product. The computer program product includes a computer readable medium. The computer readable medium includes code for generating a packet for transmission via a wireless signal. The packet is generated for transmission using at least one orthogonal frequency-division multiplexing (OFDM) symbol including thirty-two tones, the thirty-two tones corresponding to frequency subcarriers. The thirty-two tones of the at least one OFDM symbol are allocated as: twenty-four data tones, two pilot tones, five guard tones, and one direct current (DC) tone. The computer readable medium further includes code for converting the at least one OFDM symbol into a time domain signal using a thirty-two point mode. The computer readable medium further includes code for transmitting the packet via the wireless signal over a bandwidth that is lower than or equal to 1.25 MHz.

BRIEF DESCRIPTION OF THE DRAWINGS

FIG. 8A is a block diagram showing an exemplary structure of a preamble and payload of a physical layer packet for transmission over a bandwidth of substantially 1 MHz.

FIG. 8B is a block diagram showing an exemplary structure of a preamble and payload of a physical layer packet for transmission over a bandwidth of substantially 2 MHz according to a single user mode.

FIG. 8C is a block diagram showing an exemplary structure of a preamble and payload of a physical layer packet for transmission over a bandwidth of substantially 2 MHz according to a multi user mode.

DETAILED DESCRIPTION

Figure 1:
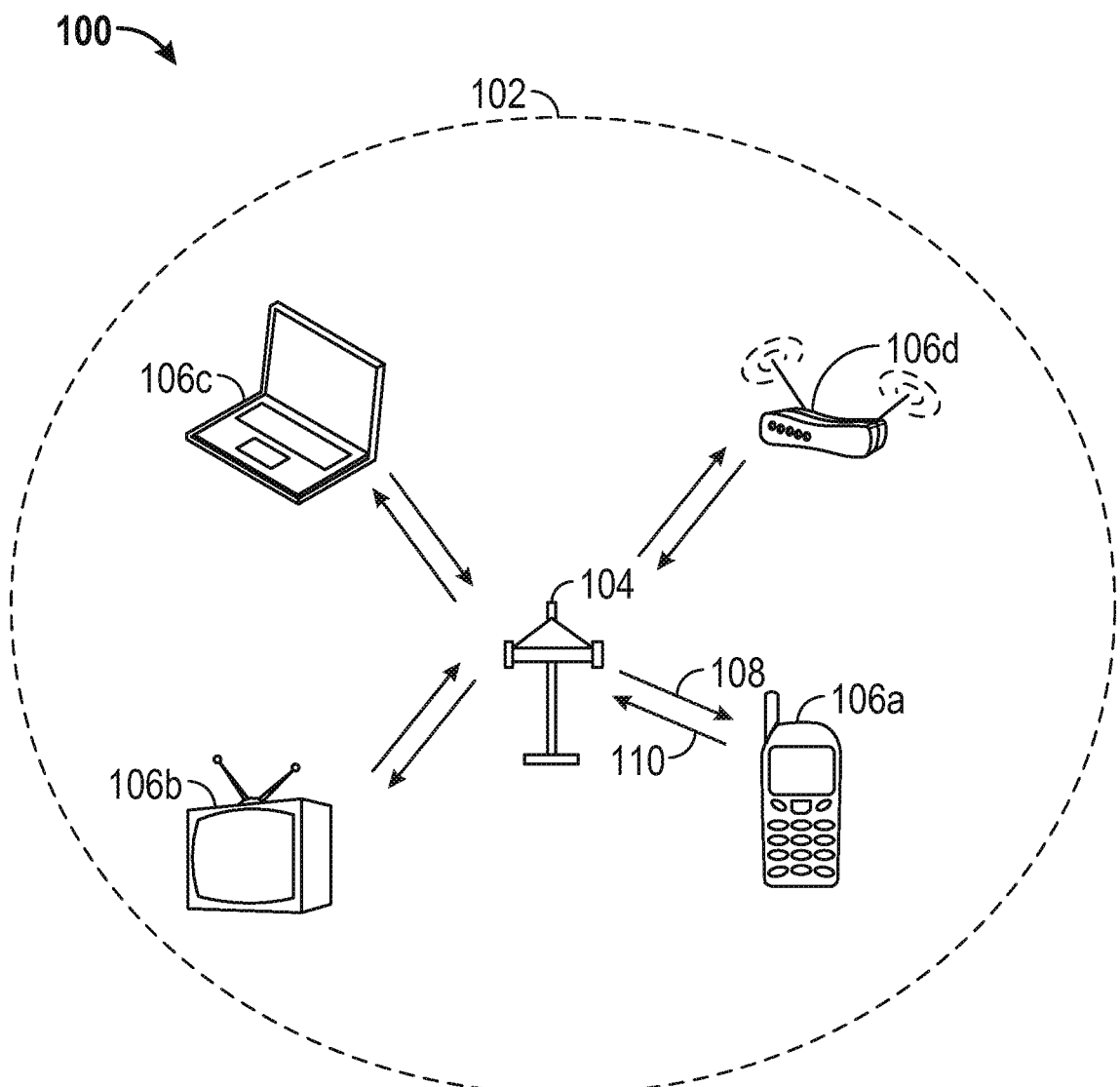
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
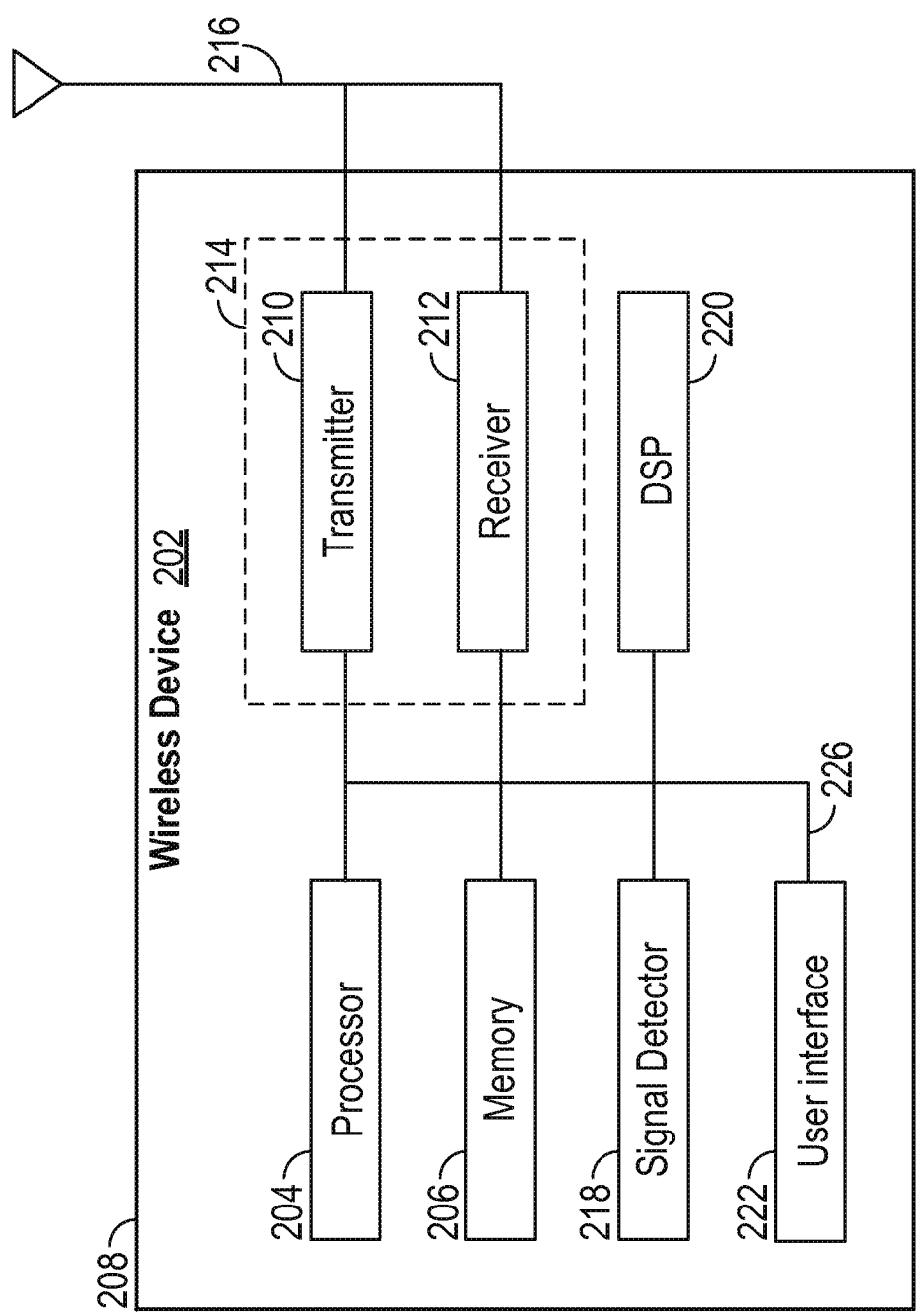
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore the processor 204 may be used to implement any of the components, modules, circuits, or the like described below, or each may be implemented using a plurality of separate elements.

Figure 3:
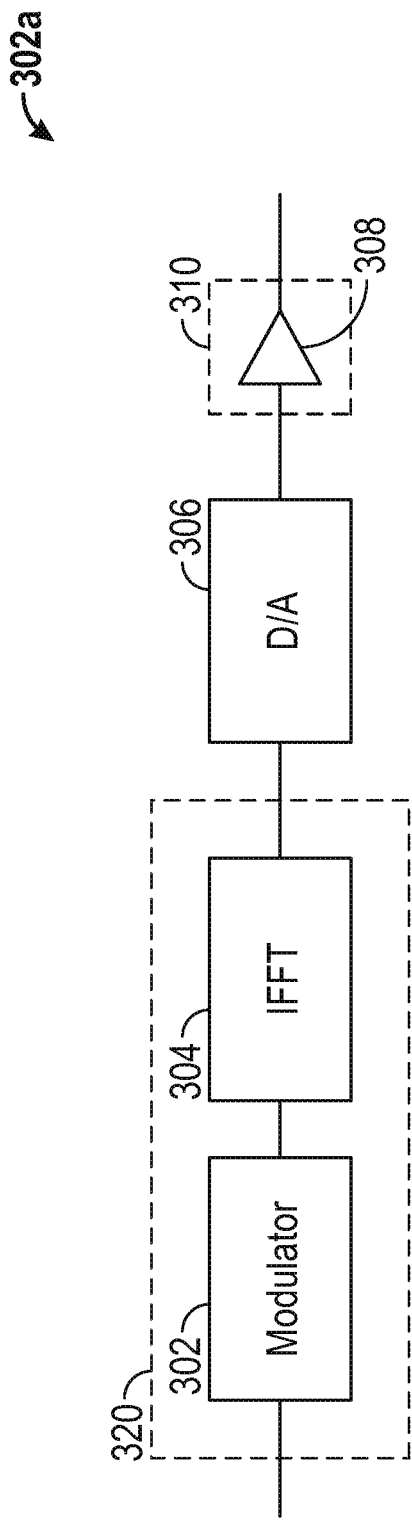
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1.25 MHz, as will be discussed in additional detail below. For ease of reference, the wireless device 202 configured with the components illustrated in FIG. 3 is hereinafter referred to as a wireless device 302a.

The wireless device 302a may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 302a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 302a (e.g., see describe above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of values or symbols. Each of the SIG fields may include information about the data unit, for example a description of a length or data rate of the data unit.

Returning to the description of FIG. 3, the wireless device 302a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below with respect to FIGS. 5-18.

Figure 4:
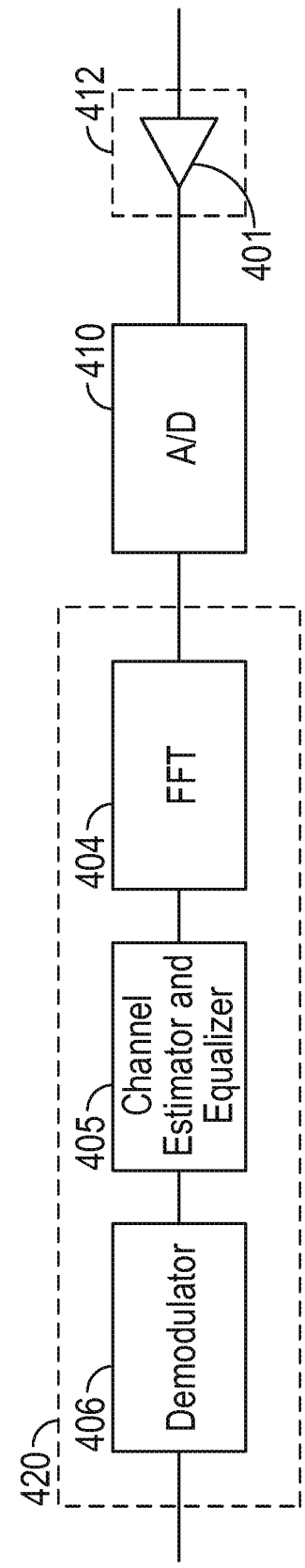
FIG. 4 shows a functional block diagram of exemplary components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units over a bandwidth of equal to or less than 1.25 MHz. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 402b.

The receiver 412 is configured to receive one or more packets or data units in a wireless signal. Data units that may be received and decoded or otherwise processed as discussed below are described in additional detail with respect to FIGS. 5-18.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 402b may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 402b. In some aspects, the analog to digital converter 410 is implemented in the transceiver 214 (FIG. 2) or in a data receive processor.

The wireless device 402b may further comprise a transform module 404 configured to convert the representation the wireless signal into a frequency spectrum. In FIG. 4, the transform module 404 is illustrated as being implemented by a fast Fourier transform (FFT) module. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 402b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 402b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in a DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 302a shown in FIG. 3 shows an example of a single transmit chain to be transmitted over an antenna. In some implementations, the wireless device 302a may implement a portion of a MIMO system using multiple antennas to simultaneously transmit data.

Figure 5:
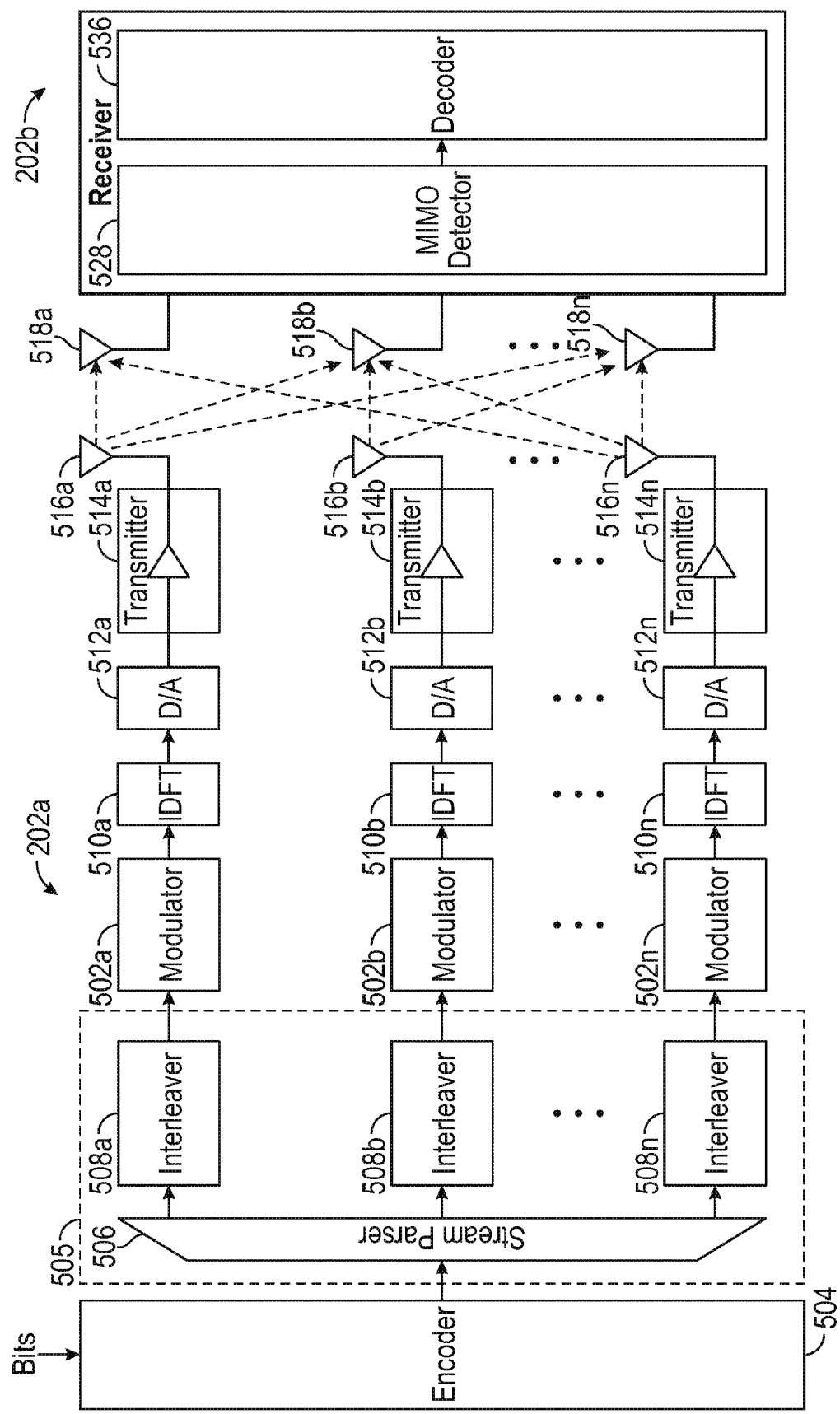
FIG. 5 is a functional block diagram of an exemplary MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX}*k+n$ (i.e., round-robin with one bit per spatial stream, then on to the next spatial stream where $k_n$ is the input bit index and $N_{TX}$ is the number of transmitters/spatial streams). Another more general function f(k,n) might also be used, for example, sending two bits to a spatial stream, then moving on to the next spatial stream. Each interleaver 508a, 508b, and 508n may each thereafter distribute bits so that errors may be recovered due to fading or other channel conditions. Hereinafter the interleavers 508a, 508b, and 508n may be referred to an interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping group of six bits), 64-QAM, and the like. The modulated bits for each stream may be provided to transform modules 510a, 510b, and 510n. In some implementations, the transform modules 510a, 510b, and 510n may perform an inverse discrete time fourier transform (IDFT) to convert the modulated bits from a frequency domain into a time domain. The transform modules 510a, 510b, and 510n may operate according to different modes as described above with reference to FIG. 3. For example, the transform modules 510a, 510b, and 510n may be configured to operate according to a 32 point mode or a 64 point mode. In some implementations, the modulated bits may be encoded using space time block coding (STBC) and spatial mapping may be performed before being provided to transform modules 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, and 514c and using antennas 516a, 516b, or 516n, into a wireless radio space over a desired frequency bandwidth (e.g., 1 MHz, 2 MHz, 4 MHz, 8 MHz, and 16 MHz, or higher).

In some embodiments, antennas 516a, 516b, and 516n are distinct and spatially separated antennas. In other embodiments, distinct signals might be combined into different polarizations off of fewer than N antennas. An example of this is where spatial rotation or spatial spreading is done, where multiple spatial streams are mapped on a single antenna. In any case, it should be understood that distinct spatial streams can be organized in different manners. For example, a transmit antenna might carry data from more than one spatial stream or several transmit antennas might carry data from a spatial stream. For example, consider the case of a transmitter with four transmit antennas and two spatial streams. Each spatial stream can be mapped onto two transmit antennas in that case, so two antennas are carrying data from just one spatial stream.

Figure 6:
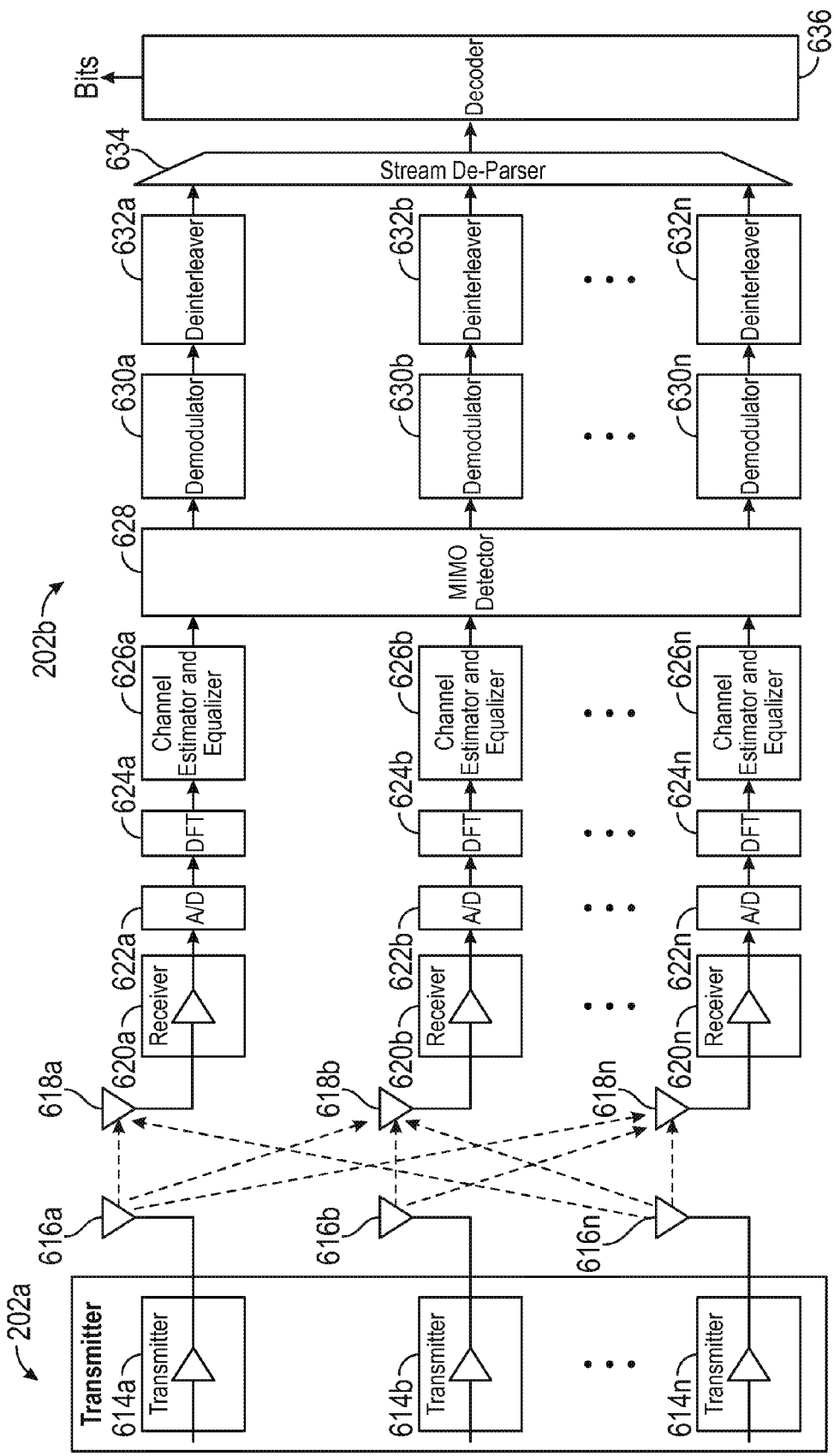
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The wireless device 202b may be configured to simultaneously receive transmissions from the antennas 516a, 516b, and 516n of FIG. 5. A wireless device 202b receives signals from the channel at N antennas 518a, 518b, and 518n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted into a frequency spectrum via transform modules 624a, 624b, and 624n. As described above, the transform modules 624a, 624b, and 624n may operating according to various modes according to the size and bandwidth used (e.g., 32 point 64 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628 which may thereafter provide its output to demodulators 630a, 630b, and 630n which may demodulate the bits according to one of the modulation techniques as described above. Demodulated bits may then be provided to deinterleavers 632a, 632b, and 632n which may pass bits into a stream de-parser 634 which may provide the bits into a single bit stream into a decoder 636 that may decode the bits into an appropriate data stream.

As described above, data units exchanged by the AP 104 and the STA 106 may include control information or data, as discussed above in the form of physical (PHY) layer packets or physical layer protocol data units (PPDUs).

Figure 7:
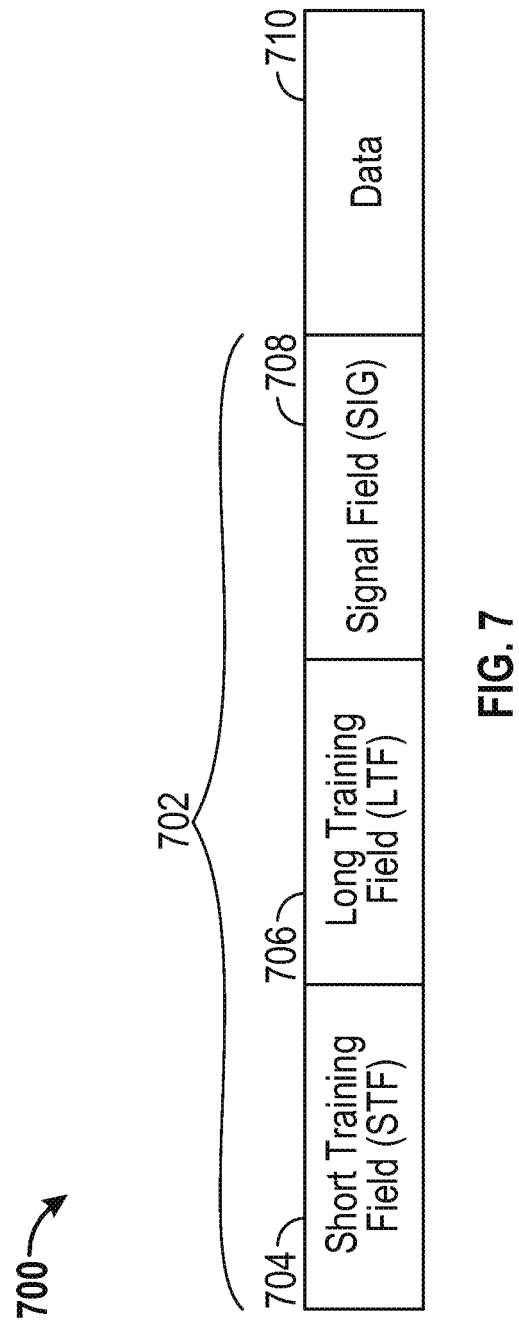
FIG. 7 is a block diagram showing an exemplary structure of a preamble and payload of a physical layer packet.

FIG. 7 is a block diagram showing an exemplary structure of a preamble 702 and payload 710 of a physical layer packet 700. The preamble 702 may include a short training field (STF) 704 that includes an STF sequence of known values. In some aspects, the STF may be used for packet detection (e.g., to detect the start of a packet) and for coarse time/frequency estimation. The STF sequence may be optimized to have a low PAPR and include a subset of non-zero tones with a particular periodicity. The STF 704 may span one or multiple OFDM symbols. The preamble 702 may further include a long training field (LTF) 706 that may span one or multiple OFDM symbols and may include one or more LTF sequences of known non-zero values. The LTF may be used for channel estimation, fine time/frequency estimation, and mode detection. The preamble 702 may further include a signal field (SIG) 708 as described above that may include a number of bits or values used in one aspect for mode detection purposes and determination of transmission parameters.

As described above, certain implementations described herein may be directed to to wireless communication systems that may be used for smart metering or in a smart grid network. These wireless communication systems may be used to provide sensor applications or be used in home automation. Wireless devices used in such systems may instead or in addition be used in a healthcare context, for example for personal healthcare. They may also be used for surveillance, to enable extended-range Internet connectivity (e.g., for use with hotspots), or to implement machine-to-machine communications. Accordingly, some implementations may use low data rates such as approximately 150 Kpbs. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to transmitting and receiving wireless signals in sub-gigahertz bands. In one aspect, this may result in a propagation gain of, for example, 8.5 dB (e.g., available due to 900 MHz vs. 2.4 GHz). In another aspect, obstruction loss may be reduced by using sub-gigahertz signal which may result in, for example, a 3 dB gain.

Certain implementations are further directed to sending wireless signals with low bandwidths in sub-gigahertz bands. This may further allow achieving greater link budget gains over other wireless communication systems. For example, in one exemplary implementation, a symbol may be configured to be transmitted or received using a bandwidth of 1 MHz. A wireless device 202 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described above may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 µs including cyclic prefix.

For example, a wireless device 302a (FIG. 3) may be configured to generate a packet for transmission via a wireless signal using a bandwidth of 1 MHz. In one aspect, the bandwidth may be approximately 1 MHz where approximately 1 MHz may be within a range of 0.8 MHz to 1.2 MHz. The packet may be formed of one or more OFDM symbols having 32 tones allocated as just described using a processor 320. A transform module 304 in a transmit chain may be configured as an IFFT module operating according to a thirty-two point mode to convert the packet into a time domain signal. A transmitter 310 may then be configured to transmit the packet.

Likewise, a wireless device 402b (FIG. 4) may be configured to receive the packet over a bandwidth of 1 MHz. In one aspect, the bandwidth may be approximately 1 MHz where approximately 1 MHz may be within a range of 0.8 MHz to 1.2 MHz. The wireless device 402b may include a processor 420 including a transform module 404 in a receive chain that may be configured as an FFT module operating according to a thirty-two point mode to transform the time domain signal into a frequency spectrum. A processor 420 may be configured to evaluate the packet. The 1 MHz mode may support a modulation and coding scheme (MCS) for both a low data rate and a "normal" rate. According to some implementations, the preamble 702 may be designed for a low rate mode that offers reliable detection and improved channel estimation as will be further described below. Each mode may be configured to use a corresponding preamble configured to optimize transmissions for the mode and desired characteristics as will be further described below.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 7 guard tones. As such, a transform module 304 or 404 may be configured to operate according to a 64 point mode when transmitting or receiving 2 MHz symbols. The symbol duration may also be 40 μs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single user mode and a multi user mode. Wireless signals using bandwidths less than or equal to 2 MHz may provide various advantages for providing wireless nodes that are configured to meet global regulatory constraints over a broad range of bandwidth, power, and channel limitations.

Additional modes transmitting over different signal bandwidths are also possible. For example symbols may be transmitted over bandwidths of 625 KHz, 1.25 MHz, or 5 MHz according to some implementations. For example, a wireless device 302a may be configured to generate a packet for transmission via a wireless signal using a bandwidth of lower than or equal to 1.25 MHz. In one aspect, the bandwidth may be lower than or equal to approximately 1.25 MHz where approximately 1.25 MHz may be within a range of 1.1 MHz to 1.4 MHz. In another aspect, the bandwidth may be between 625 KHz and 1.25 MHz. The packet may be formed of one or more OFDM symbols having 32 tones allocated as 24 data tones, 2 pilot tones, 5 guard tones, and 1 DC tone using a processor 320. A transform module 304 in a transmit chain may be configured as an IFFT module operating according to a thirty-two point mode to convert the packet into a time domain signal. A transmitter 310 may then be configured to transmit the packet.

Likewise, a wireless device 402b may be configured to receive the packet over a bandwidth of lower than or equal to 1.25 MHz. In one aspect, the bandwidth may be lower than or equal to approximately 1.25 MHz where approximately 1.25 MHz may be within a range of 1.1 MHz to 1.4 MHz. In another aspect, the bandwidth may be between 625 KHz and 1.25 MHz. The wireless device 402b may include a processor 420 including a transform module 404 in a receive chain that may be configured as an FFT module operating according to a thirty-two point mode to transform the time domain signal into a frequency spectrum. A processor 420 may be configured to evaluate the packet using one or more of the components described above with reference to FIGS. 2, 4, and 6.

In some aspects, the wireless device 202 is configured to operate according to several wireless standards, for example according to one of the 802.11 standards. In this configuration, the wireless device 202 may have a mode for operating in a 20 MHz channel width in the 2.4 GHz or 5 GHz band, as well as a mode for operating in a 40 MHz channel width in the 2.4 GHz band. In another aspect, the wireless device 202 is configured to operate pursuant to the 802.11ac standard. In this configuration, the wireless device 202 has a mode for operating in each of a 20 MHz, 40 MHz, and 80 MHz channel width. Generally, the transform module 304 or 404 may use 64 tones when the wireless device 202 is operating in the 20 MHz band, may use 128 tones when the wireless device 202 is operating in the 40 MHz band, and may use 256 tones when the wireless device 202 is operating in the 80 MHz band.

In some aspects, the controller 224 is configured to adjust operation of the wireless device 202 so as to operate in a sub-gigahertz band as described above. In one implementation, to operate according to a mode such as 1 MHz, 2 MHz, 4 MHz, etc. as described above, a controller 224 may be configured to downclock one or more of the components in the wireless device 202 such that the wireless device 202 will operate in a 1 MHz, 2 MHz, 4 MHz, 8 MHz, or 16 MHz. In addition, the controller 224 may be configured to downclock operation of one or more of the components in the wireless device 202 such that the wireless device 202 will operate in modes corresponding to using bandwidths of 5 MHz, 2.5 MHz, 1.25 MHz, and/or 0.625 MHz channel width. During such downclocked operation, the number of tones used by the transform module 304 or 404 may remain the same in some aspects.

Downclocking operation of the wireless device 202 may comprise operating one or more of the components illustrated in FIG. 2 at a reduced clock rate. For example, the downclocking may comprise operating the processor 204, the signal detector 218, the DSP 220, and/or any other digital signal circuitry at a lower rate, for example by adjusting, modifying, or assigning the timing settings of one or more of these components. In some aspects, the downclocked operation is performed in response to a command from the controller 224. In some aspects, the controller 224 provides a clock signal which is reduced in comparison to a clock signal used when operating in the 20 MHz, 40 MHz, or 80 MHz channel width.

In some aspects, the controller 224 is configured to cause the operation of the wireless device 202 to be downclocked by a factor of 10 (e.g., by 10×). In such configuration, operation in the 20 MHz channel width will be downclocked to operation in a 2 MHz channel width, and operation in the 40 MHz channel width will be downclocked to operation in a 4 MHz channel width. Furthermore, operation in the 80 MHz channel width will be downclocked to operation in an 8 MHz channel width, and operation in the 160 MHz channel width will be downclocked to operation in a 16 MHz channel width.

In some aspects, the controller 224 is configured to cause the operation of the wireless device 202 to be downclocked by a factor of 4 (e.g., by 4×). In such configuration, operation in the 20 MHz channel width will be downclocked to operation in a 5 MHz channel width, and operation in the 40 MHz channel width will be downclocked to operation in a 10 MHz channel width.

In some aspects, the controller 224 is configured to cause the operation of the wireless device 202 to be downclocked by a factor of 8 (e.g., by 8×). In such configuration, operation in the 20 MHz channel width will be downclocked to operation in a 2.5 MHz channel width, and operation in the 40 MHz channel width will be downclocked to operation in a 5 MHz channel width. Similarly, operation in the 80 MHz channel width will be downclocked to operation in a 10 MHz channel width.

In some aspects, the controller 224 is configured to cause the operation of the wireless device 202 to be downclocked by a factor of 16 (e.g., by 16×). In such configuration, operation in the 20 MHz channel width will be downclocked to operation in a 1.25 MHz channel width, and operation in the 40 MHz channel width will be downclocked to operation in a 2.5

MHz band. Similarly, operation in the 80 MHz channel width will be downclocked to operation in a 2.5 MHz channel width.

In order to enable operation in a 0.625 MHz channel width, operation in the 20 MHz channel width may be downclocked by a factor of 32 (e.g., by 32×). As discussed above, during such operation, the transform module 304 or 404 may continue to operate using 64 tones. When the wireless device 202 operates in the 0.625 MHz channel width, the carrier frequency will be reduced, which may decrease the phase noise. When the wireless device 202 operates in the 1 MHz mode, downclocking may be used, for example by a factor of 10×, for purposes such as providing the symbol duration (e.g., for 40 µs.

When operating according to a 0.625 channel width, when the transform module 304 and/or the transform module 404 uses 32 points instead of 64, operation in a 20 MHz channel width may be downclocked by 16×. Downclocking by 16× instead of by 32× reduces the increase in symbol duration, which reduces the phase drift within a transmitted symbol. In such aspects, any increase in phase noise due to downclocking by 16× instead of 32× may be offset by the reduction in phase drift, which may reduce hardware requirements. Further, requirements of the pulse position modulation (PPM) may be eased due to frequency offset in 16×. Similar benefits may also apply to using a 1 MHz bandwidth.

Similarly as described above, in one aspect, when a 1 MHz bandwidth for transmission or reception of OFDM symbols is used, a 32 point transform module 304 or 404 may be used. In this case tones may be allocated as 24 data tones, 2 pilot tones, 5 guard tones, and a DC tone. In another aspect, when a 2 MHz bandwidth for transmission or reception of OFDM symbols is used, a 64 point transform module 304 or 404 may be used. In this case tones may be allocated as 52 data tones, 4 pilot tones, 7 guard tones, and a DC tone. In yet another aspect, when a 4 MHz bandwidth for transmission or reception of OFDM symbols is used, a 64 point transform module 304 or 404 may be used. In this case tones may be allocated as 108 data tones, 6 pilot tones, 11 guard tones, and three DC tones. In yet a further aspect, when a 8 MHz bandwidth for transmission or reception of OFDM symbols is used, a 256 point transform module 304 or 404 may be used. In this case tones may be allocated as 234 data tones, 8 pilot tones, 11 guard tones, and three DC tones. Accordingly, the spacing between tones for these bandwidths may be 31.25 KHz. In addition, the symbol duration may be 40 µs including a cyclic prefix of either 4 µs (for short cyclic prefixes) or 8 µs (for long cyclic prefixes). A longer cyclic prefix may be used to accommodate outdoor delay spreads. Furthermore, large symbol durations may be needed to keep cyclic prefix overhead manageable.

Similar tone allocations may be used for other bandwidths. For example, in another aspect, when a 625 KHz bandwidth for transmission or reception of OFDM symbols is used, a 32 point transform module 304 or 404 may be used. In this case tones may be allocated as 24 data tones, 2 pilot tones, 5 guard tones, and a DC tone. In another aspect, when a 1.25 MHz bandwidth for transmission or reception of OFDM symbols is used, a 64 point transform module 304 or 404 may be used. In this case, tones may be allocated as 52 data tones, 4 pilot tones, 7 guard tones, and a DC tone. In yet another aspect, when a 2.5 MHz bandwidth for transmission or reception of OFDM symbols is used, a 64 point transform module 304 or 404 may be used. In this case tones may be allocated as 108 data tones, 6 pilot tones, 11 guard tones, and three DC tones. In yet a further aspect, when a 5 MHz bandwidth for transmission or reception of OFDM symbols is used, a 256 point transform module 304 or 404 may be used. In this case tones may be allocated as 234 data tones, 8 pilot tones, 11 guard tones, and three DC tones. Accordingly, the spacing between tones for these bandwidths may be 19.5 KHz. In addition, the symbol duration may be 51.2 µs including a cyclic prefix of either 6.4 µs (short) or 12.8 µs (long).

In some aspects, the amount by which operation of the wireless device 202 is downclocked is predetermined. For example, the downclocking factor may be stored in the memory 206 or the controller 224, and loaded at startup of the wireless device 202. In such configuration, the controller 224 may cause the wireless device 202 to operate in a downclocked mode according to the predetermined or loaded downclocking factor.

In some aspects, the amount by which operation of the wireless device 202 is downclocked at any given time may be determined in situ. For example, the signal detector 218 may determine a downclocking factor from a beacon or pilot received by the receiver 212. In some aspects, this factor is determined at startup of the device, or when connecting to the network for the first time. In some aspects, a new factor is determined during handoff of the wireless device 202 or each time the wireless device 202 connects to a new network. In some aspects, a predetermined factor may be modified or updated based on a received signal, such as based on a received beacon or pilot. In this way, the wireless device 202 may operate in different bandwidths pursuant to a location of the device or a network to which the device is connecting, for example. The controller 224 may cause the wireless device 202 to operate in a downclocked mode according to the determined downclocking factor.

In some aspects, the wireless device 202 is permanently configured to operate in the downclocked mode. For example, the components of the wireless device 202 may be hardwired or have firmware installed therein that causes the device to always perform downclocked operation. In such aspects, the wireless device 202 may be incapable of communicating in the 20 MHz, 40 MHz, and 80 MHz channel widths. Further, the factor of downclocking may be fixed in such aspects. For example, the components may be manufactured and/or installed so as to implement only the fixed downclocking factor. In other aspects, the wireless device may be operated in any of the 20 MHz, 40 MHz, and 80 MHz channel widths, or may be selectively downclocked by the controller 224 to operate in the 1 MHz, 2 MHz, 4, MHz, 8 MHz, and 16 MHz channel width.

In some implementations, when transmitting in a sub-gigahertz range (e.g., 900 MHz), a repetition mode may be used where repetition coding is implemented. A repetition mode may allow for accurate transmission over long distances without sacrificing too much preamble overhead. In some implementations 2× repetition encoding may be used. For example, repetition encoding may allow for as little as 105 dB of pathloss to provide good in-home coverage. When using a wireless sensor network, without repetition coding, customers may have to install higher-power sensors in difficult to reach places. It may not be practical to sell two types of sensors (sensors for "easy to reach places" versus "difficult to reach places"). Furthermore, high-power sensors may not be able to work with low power batteries (e.g., coin-cell batteries) due to peak current drain. Alternatively, without repetition, multiple APs could be installed. However, choosing location & configuration of the APs could be non-trivial for an average consumer. As such, repetition coding may provide various advantages for certain implementations for low data rate applications such as sensor networks.

As an example, in one aspect BPSK rate ½ coding may be used with 4× repetition yielding 94 Kbps. In another aspect, BPSK rate ½ coding may be used with 2× repetition yielding 188 Kbps. In yet another aspect, BPSK rate ½ coding may be used yielding 375 Kbps. In a further aspect, 64 QAM rate ¾ coding may be used resulting in 3.75 Mbps.

In some implementations, the 1 MHz mode and the 2 MHz mode may be required and configured to be interoperable. Using two required modes may avoid issues where devices could be configured for some regulatory regions but may not work for other regulatory regions and may allow for devices to have more options if regulatory constraints change allowing for less restrictive communications. Higher bandwidths (e.g., 8 MHz) may be used for cellular offload.

With reference to FIG. 7, when transmitting packets in sub-gigahertz bands with bandwidths as described above, the preamble 702 may be designed to have robust mode detection in an early state of the preamble to detect between different modes. The preamble 702 may further be optimized to minimize overhead and provide adequate coexistence of devices transmitting using the 1 MHz mode and devices transmitting using greater than or equal to 2 MHz modes. The preamble 702 may be designed to have robust mode detection in an early state of the preamble to detect between 1 MHz transmissions (32 pt FFT) and 2 MHz transmissions (64 pt FFT). The physical layer packet 700 may be generated for transmission for different data rates to allow in one aspect for transmission of data over greater distances. For example, the physical layer packet 700 may be generated for a low data rate along with another "normal" data rate as described above.

FIG. 8A is a block diagram showing an exemplary structure of a preamble 802a and payload 810a of a physical layer packet 800a for transmission over a bandwidth of substantially 1 MHz according to certain implementations. The physical layer packet 800a may be generated using a transform module 304 (FIG. 3) that is configured according to a 32 point FFT mode for transmitting an OFDM symbol with 32 tones as described above.

The preamble 802a may include a short training field (STF) 804a. The STF 804a may include a sequence of known values with a subset of non-zero values corresponding to a subset of non-zero tones with a particularly chosen periodicity. The periodicity of the non-zero tones may be the same as used for STF sequences used in higher bandwidths such as 2 MHz. In some implementations, the STF field 804a may be boosted, such as by 3 dB for repetition coding. The STF 804a may be sent over four OFDM symbols where each symbol repeats a known STF sequence.

The preamble 802a may further include a long training field (LTF) 806a. The LTF 806a may be formed of four OFDM symbols and may include an LTF sequence transmitted in each symbol. The LTF sequences may be formed of known non-zero values corresponding to non-zero tones for all pilot and data tones. In some implementations, the LTF sequences may therefore include 26 non-zero values.

The preamble 802a may further include a signaling field (SIG) 808a. In some exemplary implementations, the SIG field 808a may be repetition coded. In some implementations, the SIG field 808a may be 2× repetition coded. The physical layer packet 800a may further include the payload 810a that may be generated using 24 tones in each OFDM symbol allocated for data. The preamble 802a may be used for generating either a low rate or a normal rate 1 MHz transmission. The preamble 802a may be used according to a single user mode.

As described above, the SIG field 808a for a 1 MHz mode may be two symbols. In one implementation, the entries into the SIG field 808a may correspond to the entries shown in Table 1 below. As such, the SIG field 808a may include 36 bits. The SIG field 808a may be coded at BPSK-rate ½ repetition 2×.

TABLE 1

| Field | Bits | Description |
| --- | --- | --- |
| Space Time Coding Block | 1 | May indicate whether Space Time Block Coding is used |
| Number of Spatial Streams | 2 | |
| Short Guard Interval | 1 | |
| Coding | 2 | $1^{st}$ bit may be coding type (LDPC/BCC) while $2^{nd}$ bit may be for LDPC $N_{sym}$ ambiguity |
| Modulation Coding Scheme (MCS) | 4 | |
| Aggregation Bit | 1 | Signals use of AMPDU |
| Length | 9 | My be in symbols when aggregation is on or in bytes when aggregation is off. An AMPDU may be required for packet sizes greater than 511 bytes |
| Reserved | 6 | May be used for MAC bits |
| CRC | 4 | |
| Tail | 6 | May be needed for BCC but could be less bits |

FIG. 8B is a block diagram showing an exemplary structure of a preamble 802b and payload 810b of a physical layer packet 800b for transmission over a bandwidth of substantially 2 MHz according to a single user mode. The physical layer packet 800b may be generated using a transform module 304 (FIG. 3) that is configured according to a 64 point FFT mode for transmitting an OFDM symbol with 64 tones as described above.

The preamble 802b may include a short training field (STF) 804b. The STF 804b may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802b may further include a long training field (LTF) 806b. The LTF 806b may be formed of two OFDM symbols and may include LTF sequences transmitted in each symbol. The LTF sequences may comprise non-zero values corresponding to non-zero tones for all pilot and data tones. The LTF sequences may therefore include 56 non-zero values in some implementations. The preamble 802b may further include a signaling field (SIG) 808b. The SIG field 808b may be formed from two OFDM symbols. The two OFDM symbols of the SIG field 808b may each be QBPSK rotated. If more than one spatial streams are being used, the preamble 802b may include additional long training fields (LTFs) 816b for each of the additional spatial streams being used (e.g., as the LTF 804b may correspond to the first spatial stream if there are more than one). The physical layer packet 800b may further include the payload 810b that may be generated using 52 tones in each OFDM symbol allocated for data. The preamble 802b may be used according to a single user mode.

FIG. 8C is a block diagram showing an exemplary structure of a preamble 802c and payload 810c of a physical layer packet 800c for transmission over a bandwidth of 2 MHz according to a multi user mode. As described above with reference to FIG. 8B, the physical layer packet 800c may be generated using a transform module 304 (FIG. 3) that is configured according to a 64 point FFT mode for transmitting an OFDM symbol with 64 tones.

The preamble 802c may include a short training field (STF) 804c. The STF 804c may include a sequence of known values with a subset of non-zero values corresponding to a subset of non-zero tones over 64 tones with a determined periodicity. The periodicity of the non-zero tones may be the same as used for STF sequences used for 1 MHz transmissions. The preamble 802c may further include a long training field (LTF) 806c. The LTF 806c may be formed of two OFDM symbols and may include LTF sequences transmitted in each symbol. The LTF sequences may comprise non-zero values corresponding to non-zero tones for all pilot and data tones. The LTF sequences may therefore include 56 non-zero values according to some implementations. The preamble 802c may further include a signaling field (SIG) 808c. The SIG field 808c may be formed from two OFDM symbols. The first of the two OFDM symbols of the SIG field 808c may be QBPSK rotated. In one aspect, this allows for the receiver to detect whether the packet 800c is multi-user mode packet or a single user mode packet based on whether only one of the SIG field symbols is QBPSK rotated. The preamble 802c may further include a very high throughput short training field (VHT-STF) 814c. The VHT-STF 814c may correspond to a VHT-STF used for IEEE 802.11ac transmissions. The preamble 802c may further include one or more very high throughput long training fields (VHT-LTFs) 816c corresponding to each spatial stream being used. The VHT-LTFs 816c may correspond to VHT-LTFs used for IEEE 802.11ac transmissions. The preamble 802c may further include a very high throughput signal field (VHT-SIG-B) 818c. The VHT-SIG-B 818c may correspond to the VHT-SIG-B used for IEE 802.11ac transmissions. The physical layer packet 800c may further include the payload 810c that may be generated using 52 tones in each OFDM symbol allocated for data. The preamble 802c may be used according to a multi user mode.

Differentiating between a 32 point mode (i.e., 1 MHz) and a 64 point mode (2 MHz) may be done by using an LTF sequence that is orthogonal in frequency across 32 and 64 tone mode, or by detecting the QBPSK rotation on the $1^{st}$ SIG symbol.

As described above, a wireless device 202 may be configured to generate OFDM symbols for transmission over bandwidths greater than 2 MHz, such as for 4 MHz, 8 MHz, 16 MHz, and 32 MHz. In some implementations, when sending OFDM symbols over bandwidths greater than 2 MHz, the SIG field 806b (FIG. 8B) may be duplicated in every 2 MHz segment of the OFDM symbol and may be used to be able to determine the bandwidth of the symbol. As the OFDM symbol for the SIG field may use 52 tones allocated for data, duplication of the SIG field may leave 7 guard tones (3 and 4 tones on the ends of the symbol) for higher bandwidths (4 MHz, 8 MHz, 16 MHz).

In some cases, it may be desirable to use additional guard tones for the LTF 806b and/or SIG 808b fields. For example, it may be desirable for the 4 MHz, 8 MHz, and 16 MHz preamble symbols to correspond to corresponding symbols used for 40 MHz, 80 MHz, and 160 MHz of 802.11ac transmissions. As one example, the LTF 806b may use the VHT-LTFs for 40 MHz, 80 MHz, and 160 MHz 802.11ac transmissions depending on whether the OFDM symbol is for 4 MHz, 8 MHz, and 16 MHz respectively. As the VHT-LTFs for 40 MHz, 80 MHz, and 160 MHz have 11 guard tones (5/6), using these VHT-LTFs may not provide non-zero values for channel estimation for 2 tones at each edge, for example if the SIG 808b field allocated 52 tones for data. Furthermore, there may be stricter filtering requirements for symbols being transmitted using greater bandwidths (4 MHz, 8 MHz, and 16 MHz) if the LTF 806b and SIG 808b are transmitted using 52 data tones (i.e., having less guard tones). Duplicating the LTF 802b used for 2 MHz transmissions may fail to adequately address these issues as the LTF uses 52 non-zero tones and thus the same guard tone issue remains. As such, an optimized LTF 806b and SIG 808b may be provided for 2, 4, and 8 MHz transmissions. In one aspect, the fields are chosen so as to be able to re-use 20, 40, and 80 MHz LTF sequences used for IEEE 802.11ac packets.

As such, in one implementation, for the 2 MHz packets shown in FIGS. 8B and 8C, the SIG fields 808b and 808c may be transmitted using a different tone allocation than the rest of the fields of the packets 800b and 800c. For example, The SIG fields 808b and 808c may be transmitted using 48 data tones rather than 52 data tones. This may correspond to the tone allocation used for an L-SIG of 802.11a tone allocation. This SIG field 808b and 808c may then be duplicated for each 2 MHz segment for transmissions over 2 MHz. In another implementation, the STFs 804b and 804c, the LTFs 806b and 806c, and the SIG fields 808b and 808c may be generated for transmission using a different tone allocation than the rest of the fields of the packet. For example the STFs 804b and 804c, the LTFs 806b and 806c, and the SIG fields 808b and 808c may be generated for transmission using 48 tones allocated for data.

As described above, the SIG fields 808b and 808c for a 2 MHz mode may use two symbols transmitting up to 52 bits of data. The entries into the SIG fields 808b and 808c may correspond to the entries shown in Table 2 below. The first 26 bits that are un-shaded may correspond to the first symbol while the last 26 bits that are shaded may correspond to the second symbol. It should be appreciated that while 52 bits of data are shown in the table below, however as described above, in some implementations, the SIG fields 808b and 808c may be sent using 48 data tones and as such the SIG field may correspond to 48 bits. In one corresponding implementation, the number of reserved bits shown in Table 2 below may be reduced so that 48 bits are sent or received.

TABLE 2

| Field | Bits | Description |
| --- | --- | --- |
| Bandwidth | 2 | This may indicate a bandwidth mode (e.g., 2 MHz, 4 MHz, 8 MHz, or 16 MHz) |
| Reserved | 1 | |
| Space Time Block Coding | 1 | Indicates whether Space Time Block Coding is used |
| Nsts/GID/AID | 14 | For Single User (SU) Mode - 2 bits may indicate Nsts, 0-12 bits may indicate partial AID. For Multi User (MU) Mode - 8 bits may indicate Nsts, 6 bit GID |
| Reserved | 1 | |
| Short Guard Interval (SGI) | 1 | |
| Coding | 2 | $1^{st}$ bit may indicate a coding type for SU (or for user zero for MU) while $2^{nd}$ bit may be used for LDPC Nsym ambiguity |
| Modulation Coding Scheme (MCS) | 4 | For MU mode, the first 3 bits may indicate coding type for users 1-3 while the last is reserved) |
| Beamformed | 1 | May indicate to the receiver if a beamforming steering matrix is applied to the waveform in a SU mode |
| Aggregation Bit | 1 | Reserved for MU |
| Length | 9 | Length field (in symbols when aggregation is on and in bytes when aggregation is off) May mandate AMPDU for packet sizes >511 bytes and for MU |
| Reserved | 4 | Doppler bit may be indicated here |
| Midamble/ Doppler | 1 | |

TABLE 2-continued

| Field | Bits | Description |
|---|---|---|
| CRC | 4 | |
| Tail | 6 | May be needed for BCC |

Figure 9:
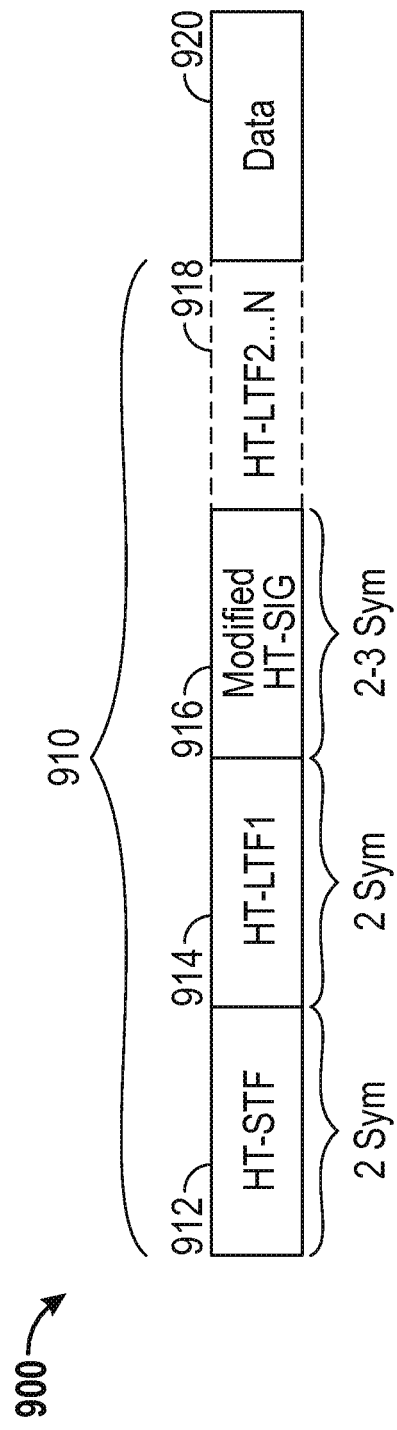
FIG. 9 is a block diagram shown another exemplary structure of a preamble and payload of a physical layer packet for transmission via wireless signal.

FIG. 9 is a block diagram showing another exemplary structure of a preamble 910 and payload 920 of a physical layer packet 900 for transmission via wireless signal. The packet 900 may be used when the wireless device 202 is downclocked from the 20 MHZ channel width or the 40 MHz channel width to operate in a 1.25 MHz or 2.5 MHz channel width, respectively.

In the illustrated aspect, the packet 900 comprises a preamble 910 and a payload 920. The preamble 910 may include a training field and signal (SIG) field. In the aspect illustrated in FIG. 9, the training field comprises a short training field (STF) 912 followed by a long training field (LTF) 914. Each of the STF 912 and LTF 914 may comprise 2 symbols.

The preamble 910 further comprises a SIG field 916. The SIG field 916 may indicate a duration of the packet 900, as well as other parameters such as bandwidth of a remaining portion of the packet 900. In some aspects, the SIG field 916 comprises a space-time block coding (STBC) sub-field, a modulation and coding scheme (MCS) sub-field, and/or a cyclic redundancy check (CRC) sub-field. As illustrated in FIG. 9, the SIG field 916 may comprise 2-3 symbols. In some aspects, the SIG field 916 comprises a greater number of symbols.

In some aspects, the SIG field 916 is transmitted in the lowest bandwidth being used in the wireless system 100 or being used by the AP 104, or is transmitted to be compatible with a transform module using the lowest number of points in the wireless system 100. For example, when 1.25 MHz and 2.5 MHz channel widths are being transmitted over 64 and 128 tones, respectively, the SIG field 916 is transmitted over 64 tones. This may similarly be applied for channel widths of 1 MHz and 2 MHz respectfully. This allows terminals that are incapable of receiving communications over the higher bandwidth or over a greater number of tones, or terminals that are not listening on the higher bandwidth or over the greater number of tones, to receive the SIG field 916 and determine the length of the packet 900. In this way, collisions in the system 100 may be reduced because all terminals, regardless of the bandwidth or transform module they are using, may determine when the packet 900 is being communicated. The STF 912 and/or the LTF 914 may be transmitted in the same channel width or over the same number of tones as the SIG field 916. A remaining portion of the packet 900 may be transmitted in the same bandwidth or in a different bandwidth, or over the same or a different number of tones, which may be indicated in the SIG field 916.

The STF 912 and the LTF 914 may comprise a high throughput short training field sequence (HT-STF) and an HT-LTF, respectively that may correspond to fields used according to an IEEE 802.11n transmission. In the preamble 910, however, the length of the SIG field 916 may be greater than the length of the HT-SIG field in the Greenfield preamble. This increased length may be used to indicate transmission features which are not available in the 802.11n standard.

For example, in addition to being used when the wireless device 202 is downclocked to operate in a 1.25 MHz or 2.5 MHz channel width, the packet 900 may additionally be used when the wireless device 202 is downclocked from the 80 MHz channel width to operate in a 5 MHz channel width. In this aspect, the SIG field 916 may include an additional symbol so that the SIG field 916 may indicate whether a 1.25 MHz, 2.5 MHz, or 5 MHz channel width is used for a remaining portion of the packet 900.

In some aspects, the length of the STBC sub-field, MCS sub-field, or CRC sub-field may be reduced in comparison to the 802.11n Greenfield preamble. For example, instead of including a number of bits in the STBC sub-field sufficient to allow for an odd number of space-time streams, the STBC sub-field may be reduced to one bit in some aspects. In such aspect, the bit indicates whether STBC encoding was performed with respect to all of the space-time streams or alternatively none of the space-time streams. When the length of the STBC sub-field, MCS sub-field, and/or CRC sub-field is reduced, the SIG field 916 may include bits that indicate whether a 1.25 MHz, 2.5 MHz, or 5 MHz channel width is used for a remaining portion of the packet 900 without increasing the length of the SIG field 916 in comparison to the 802.11n Greenfield preamble (and similarly for a 1 MHz, 2 MHz, or 4 MHz channel width). In one aspect, the MCS sub-field may have a length of less than 7 bits while the CRC sub-field may have a length of less than 8 bits. As shown in Tables 1 and 2, the MCS sub-field may have a length of 4 bits while the CRC may also have a length of 4 bits.

In some aspects, the SIG field 916 may comprise an indicator signifying whether multi-user multiple input multiple output (MU-MIMO) information is included. In these aspects, some or all of the MU-MIMO information may be transmitted in the SIG field 916. Thus, the increased length of the SIG field 916 may be used to include such indicator and/or such MU-MIMO information.

In some aspects, the SIG field 916 is transmitted and received over 52 data tones. In contrast, the HT-SIG field is typically sent over 48 data tones when transmitting pursuant to 802.11n in order to accommodate legacy terminals. Further, the SIG field 916 may be transmitted without rotation in some aspects, in contrast to 802.11n Greenfield transmission.

The packet 900 may further comprise one or more data or extension LTFs 918. The data or extension LTFs 918 may be used to form a channel estimate for demodulating the payload 920. In aspects where MU-MIMO information is included in the SIG field 916, the number of data or extensions LTF 918 may be based at least in part on the number of users for which the MU-MIMO information is included. Further, the packet 900 may include one or more additional STFs after the SIG field 918 when the MU-MIMO information is included. The one or more additional STFs may be steer or beamformed, for example by using different precoding.

When the system 100 is using 1.25 MHz, 2.5 MHz, and 5 MHz channel widths, or when the wireless device 202 is configured to receive or transmit communications over all three of these bandwidths, a preamble that is similar to the preamble used in 802.11ac communications may be used by the wireless device 202. As discussed above, a 20 MHz, 40 MHz, or 80 MHz channel width may be used with 802.11ac communications. Thus, a downclocked version of the 802.11ac preamble may be used when channel widths of 1.25 MHz, 2.5 MHz, and 5 MHz are being used.

In some aspects, the L-SIG field which is generally included in the 802.11ac preamble may be omitted in the downclocked preamble. Omitting the L-SIG field may reduce the length of the preamble in some aspects.

Figure 10:
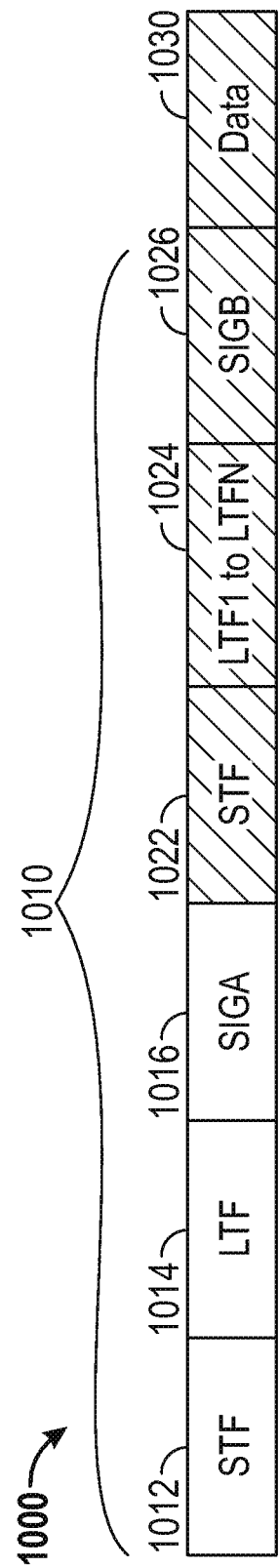
FIG. 10 is a block diagram shown another exemplary structure of a preamble and payload of a physical layer packet for transmission via wireless signal.

FIG. 10 illustrates an example of a packet 1000 in which an L-SIG field is omitted. The packet 1000 may comprise a PHY layer packet for use with the wireless device 202. The packet 1000 may be used when the wireless device 202 is downclocked from the 20 MHZ, 40 MHz, and 80 MHz channel widths to operate in 1.25 MHz, 2.5 MHz, and 5 MHz channel widths, respectively.

The packet 1000 comprises a preamble 1010 and a payload 1030. The preamble 1010 comprises an STF 1012, and LTF 1014, and a SIGA field 1016. In some aspects, the STF 1012, LTF 1014, and SIGA field 1016 may include information similar to the information included in the STF 912, LTF 914, and SIG field 916, respectively.

In one aspect, an L-SIG field that could be included between the LTF 1014 and the SIGA field 1016 in other implementations is omitted. In some aspects, the length of the SIGA field 1016 is less than the length of the combined length of the L-SIG field and the SIGA field in the 802.11ac standard. In some aspects, the SIGA field 1016 indicates a duration of the packet 1000 and/or indicates whether MU-MIMO information is included. The SIGA field 1016 may further indicate which of the 1.25 MHz, 2.5 MHz, and 5 MHz channel widths is used for a remaining portion of the packet 1000 (or similarly 1 MHz, 2 MHz, and 4 MHz).

The preamble 1010 may further comprise one or more STFs 1022 and one or more LTFs 1024. The STFs 1022 and LTFs 1024 may include information similar to the information included in the LTFs 918 and the additional STFs discussed above with respect to FIG. 9. The preamble 1010 may further comprise one or more SIGB fields 1026. The SIGB fields 1026 may include user-specific information such as modulation and coding rate.

In some aspects, the portions of the packet 1000 that are shaded in FIG. 10 are spatially multiplexed, beamformed, or otherwise steered to a different device, for example when MU-MIMO is used. Each of the STFs 1022, LTFs 1024, and/or SIGB fields 1026 may include information specific to a user or device when MU-MIMO is used.

Figure 11:
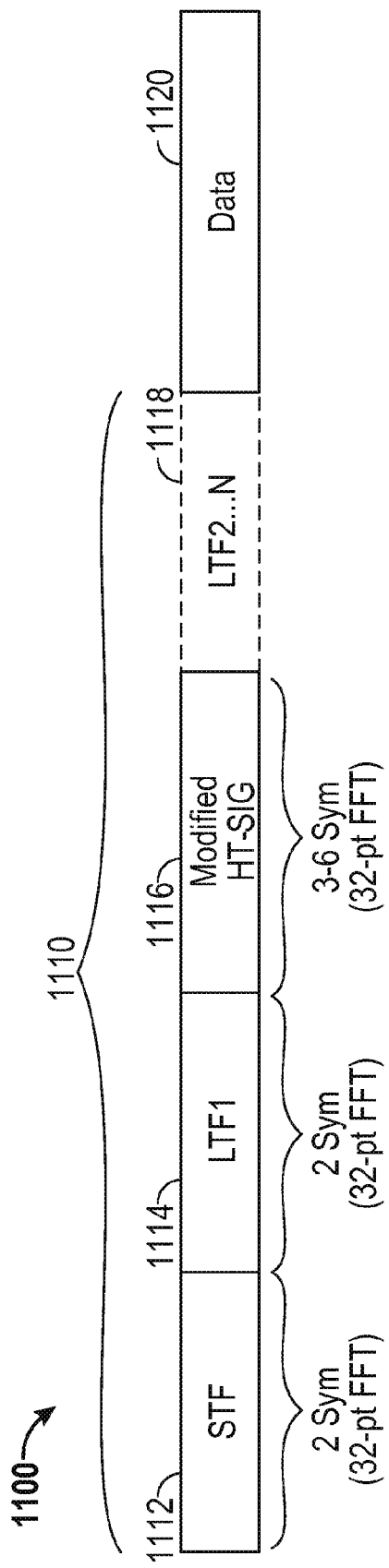
FIG. 11 is a block diagram shown another exemplary structure of a preamble and payload of a physical layer packet for transmission via wireless signal.

FIG. 11 illustrates an example of a packet 1100. The packet 1100 may comprise a PHY layer packet for use with the wireless device 202, for example. The packet 1100 may be used in the system 100 when the 0.625 MHz channel width is enabled.

The packet 1100 comprises a preamble 1110 and a payload 1120. The preamble 1110 comprises an STF 1112, an LTF 1114, and a SIG field 1116. The STF 1112 and the LTF 1114 each comprise two symbols, and may include information similar to the information included in the STF 912 and the LTF 914, respectively.

In contrast to the STF 912 and the LTF 914, however, both of the STF 1112 and the LTF 1114 are compatible with a transform module using 32 points. For example, the wireless device 202 may generate the STF 1112 and the LTF 1114 by using the 32-point mode of the transform module 304 when generating the packet 1100 for transmission. Similarly, the wireless device 202 may use the 32-point mode of the transform module 404 to evaluate the STF 1112 and the LTF 1114 when the packet 1100 is received.

In some aspects, the STF 1112 and the LTF 1114 are optimized to have a low peak-to-average power ratio (PAPR) over 32 tones. The STF 1112 and LTF 1114 may be repeated across frequencies when transmitted over bandwidths greater than 0.625 MHz.

In the aspect illustrated in FIG. 11, the SIG field 1116 comprises 3-6 symbols. In some aspects, the SIG field 916 comprises a greater number of symbols. Further, the SIG field 1116 is compatible with a transform module using 32 points.

The SIG field 1116 may include all of the information which the SIG field 916, discussed above with respect to FIG. 9, includes. For example, the SIG field 1116 may indicate a duration of the packet 1100, as well as other parameters. The SIG field 1116 may comprise an STBC sub-field, an MCS sub-field, and/or a CRC sub-field. The SIG field 1116 may further include information regarding MU-MIMO, and may indicate whether a 0.625 MHz, 1.25 MHz, 2.5 MHz, or 5 MHz channel band is used for a remaining portion of the packet 1100 (or similarly 1 MHz, 2 MHz, 4 MHz, or 8 MHz).

The SIG field 1116 may be transmitted over 32 tones, however, due to the compatibility with the transform using 32 points. Thus, the length of the SIG field 1116 is greater than the length of the SIG field 916 in order to accommodate all of the information that may be contained in the SIG field 1116. In some aspects, the length of the SIG field 1116 is double the length of the SIG field 916 when similar information is included in the two. In some aspects, the SIG field 1116 may have fewer than twice the number of symbols in the SIG field 916 when transmitted similar information. For example, although the SIG field 914 may comprise 2 symbols in certain aspects, the SIG field 1116 may consist of only 3 symbols when transmitting the same information. This may be accomplished in some aspects by reducing the number of bits in the STBC, MCS, and/or CRC sub-fields.

In some aspects, the length of the SIG field 1116 varies based on its contents. The SIG field 1116 may be repeated across frequencies when transmitted over bandwidths greater than 0.625 MHz.

The preamble 1110 may further comprise one or more data or extension LTFs 1118. The data or extension LTFs 1118 may be configured similar to the LTFs 918, and the payload 1120 may be configured similar to the payload 920, except that each of the LTFs 1118 and the payload 1120 may be transmitted or received in the 0.625 MHz channel width. Thus, each of the each of the LTFs 1118 and the payload 1120 may be operated on by a transform module using 32 points, and each may be received over 24-32 tones.

Figure 12:
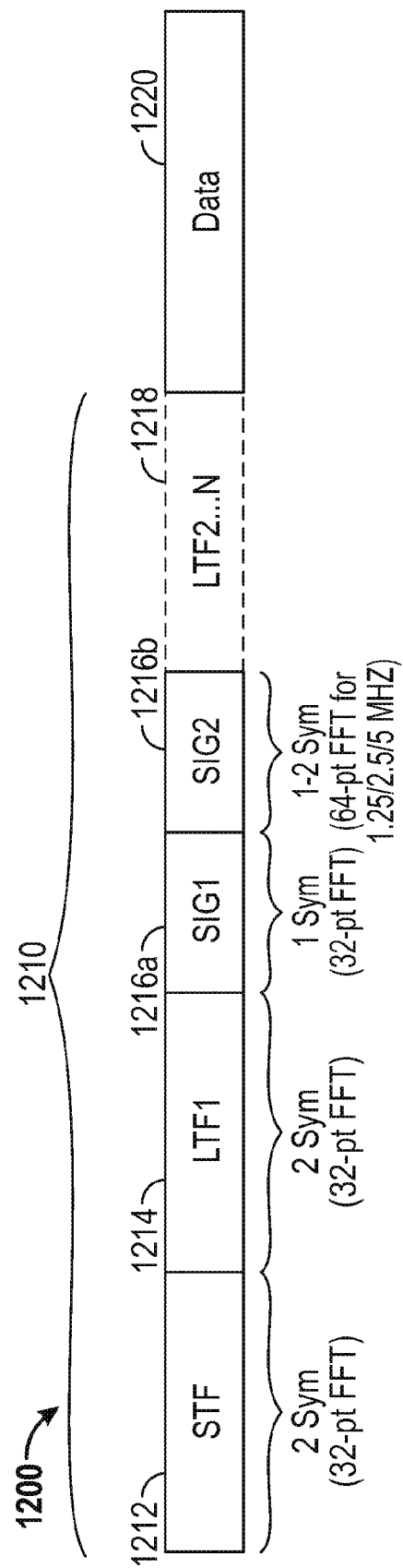
FIG. 12 is a block diagram shown another exemplary structure of a preamble and payload of a physical layer packet for transmission via a wireless signal.

In some aspects, it may be possible to reduce the length of the SIG field 1116 by dividing the SIG field 1116 into a plurality of portions. For example, FIG. 12 illustrates an example of a packet 1200 having a divided SIG field. The packet 1200 may comprise a PHY layer packet for use with the wireless device 202, and may be used in the system 100 when the 0.625 MHz channel width is enabled.

The packet 1200 comprises a preamble 1210 and the payload 1220, discussed above with respect to FIG. 11. The preamble 1210 comprises the STF 1212 and the LTF 1214 discussed above.

The preamble 1210 further comprises a SIG1 field 1216a and a SIG2 field 1216b. In some aspects, a great number of SIG fields may be included in the packet 1200. In the aspect illustrated in FIG. 12, the SIG1 field 1216a comprises one symbol, and the SIG2 field 1216b comprises 2-3 symbols. In some aspects, either of the SIG1 field 1216a and the SIG2 field 1216b may comprise additional symbols.

In the packet 1200, a SIG1 field 1216a is compatible with a transform module having the smallest size in the wireless system 100. In the wireless system 100 discussed above, the smallest size transform module uses 32 points (e.g., when transmitting or receiving in the 0.625 MHz channel width). As can be seen in FIG. 12, the SIG1 field 1216a is compatible with a transform module using 32 tones, and thus may be transmitted and received over 32 tones. The SIG1 field 1216a may be repeated across frequencies when transmitted over bandwidths greater than 0.625 MHz.

The SIG1 field 1216a may indicate a duration of the packet 1200. Thus, all terminals in the wireless system 100, regardless of the bandwidth or transform module they are using, may determine when the packet 1200 is being communicated. Further, the SIG1 field 1216a indicates a number of tones or a transform module size for receiving the SIG2 field 1216*b*, or a bandwidth over which the SIG2 field 1216*b* is transmitted. For example, the SIG1 field 1216*a* may indicate whether the SIG2 field 1216*b* should be evaluated with a transform module using 32 points or 64 points, and/or whether the SIG2 field 1216*b* should be received over the 0.625 MHz channel width, or over a 1.25 MHz, 2.5 MHz, or 5 MHz channel width.

In some aspects, a higher bandwidth is used for the SIG2 field 1216*b* than is used for the SIG1 field 1216*a*. The higher bandwidth may be used when transmitting to terminals that are configured for reception in the higher bandwidth, or based on a bandwidth allocation determined by the AP 106. In some aspects, the amount of information being conveyed in the SIG2 field 1216*b* may be used to determine which bandwidth is used for the SIG2 field 1216*b*.

When the SIG2 field 1216*b* is transmitted in a greater bandwidth, for example over a greater number of tones, than the SIG1 field 1216*a*, more information may be included in the SIG2 field 1216*b* than may fit in the SIG1 field 1216*a*. Bifurcating the SIG field of the packet 1200 as discussed herein may therefore ensure that the duration of the packet 1200 may be properly determined by all terminals in the system 100, while reducing the length of the SIG field (i.e., the combined length of the SIG1 field 1216*a* and SIG2 field 1216*b*) in certain communications. For example, the SIG2 field 1216*b* may be transmitted over 64 tones for bandwidths greater than 0.625 MHz, which may reduce the 3-6 symbol length of the SIG field 1116 illustrated in FIG. 11. Such transmission may in some aspects reduce the combined length of the SIG1 field 1216*a* and SIG2 field 1216*b* to two totals symbols.

The packets and functionality described above with reference to FIGS. 9-12 may be likewise applied to channel widths of 1 MHz, 2 MHz, 4 MHz, and 8 MHz (e.g., where 0.625 MHz may correspond to 1 MHz, 1.25 MHz may correspond to 2 MHz, and so on).

As described above, in some aspects, it may be desirable to use a preamble and/or packet format suitable for a transmission rate that is lower than the rate exhibited when using one of the packets 800-1200 described above. In such aspects, a downclocked version of the preamble used in the 802.11b standard may be implemented. In these aspects, 32× downclocking may be performed to enable a 0.625 MHz channel width, and 16× downclocking may be performed to enable a 1.25 MHz channel width, for use with direct-sequence spread spectrum (DSSS) communications. In one aspect, the shorter preamble defined in the 802.11b standard is downclocked for use with the DSSS communications. Although the shorter preamble defined in 802.11b is typically associated with a rate of 2 Mbps and the longer preamble defined in 802.11b is typically associated with a rate of 1 Mbps, in some aspects the wireless device 202 implements a downclocked 802.11b short preamble which is associated with rates at least as low as 1 Mbps scaled by the factor that is used to perform the downclocking.

Figure 13:
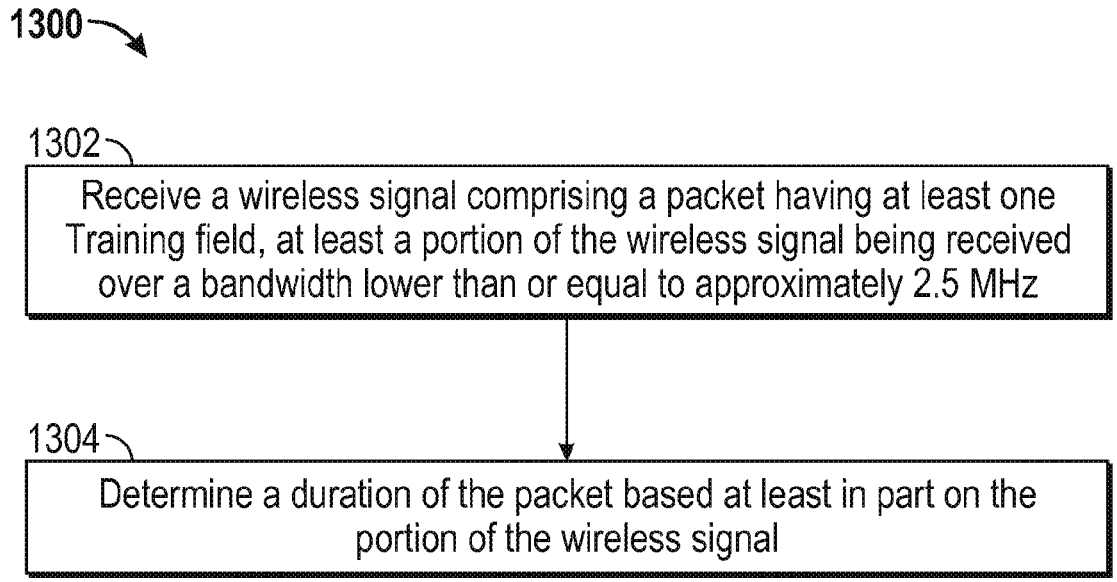
FIG. 13 is a flow chart of an exemplary method for receiving and determining a duration of a packet sent via a wireless signal.

FIG. 13 illustrates an aspect of a method 1300 for generating and transmitting a packet. The method 1300 may be used to generate any of the packets described above. The packets may be generated at either the AP 104 or the STA 106 and transmitted to another node in the wireless network 100. Although the method 1300 is described below with respect to elements of the wireless device 202, those having ordinary skill in the art will appreciate that other components may be used to implement one or more of the steps described herein.

At block 1302, a packet is generated for wireless transmission. In the aspect illustrated in FIG. 13, the packet includes at least one training field and information indicating a duration of the packet. The generation may be performed by the processor 204 and/or the DSP 220, for example using the modulator 302 and the transform module 304. Operation of one or more of these components may be downclocked by the controller 224 during the generation. The training field may comprise an STF and/or and LTF. The information may be included in a SIG field of the packet.

Next, at block 1304, a wireless signal including the packet is transmitted. In the aspect illustrated in FIG. 13, at least a portion of the wireless signal is transmitted over a bandwidth lower than or equal to approximately 2.5 MHz. The transmission may be performed by the transmitter 210, for example. Further, operation of the transmitter 210 may in some aspects be controlled at least in part by the controller 224. The portion may be transmitted over 32 tones in some aspects. The portion may correspond to a SIG field of the packet or to a first portion of a bifurcated SIG field.

Figure 14:
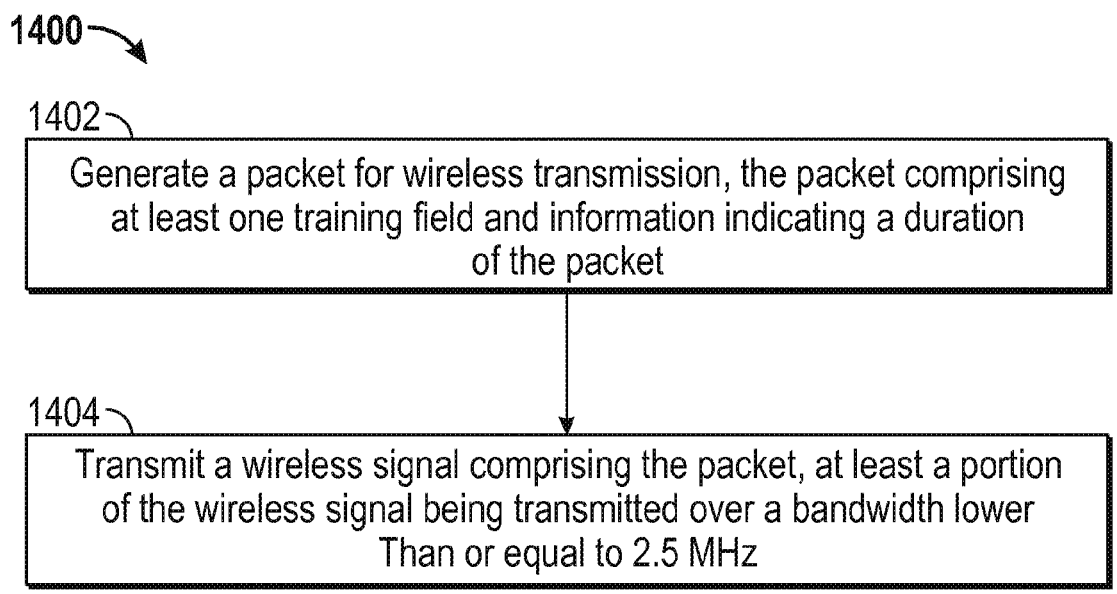
FIG. 14 is a flow chart of an exemplary method for generating and transmitting a packet via a wireless signal.

FIG. 14 illustrates an aspect of a method 1400 for receiving and processing a packet. The method 1400 may be used to receive any of the packets described above. The packets may be received at either the AP 104 or the STA 106 from another node in the wireless network 100. Although the method 1400 is described below with respect to elements of the wireless device 202, those having ordinary skill in the art will appreciate that other components may be used to implement one or more of the steps described herein.

At block 1402, a wireless signal including a packet is received. In the aspect illustrated in FIG. 10, the packet includes at least one training field. In this aspect, at least a portion of the wireless signal is received over a bandwidth lower than or equal to approximately 2.5 MHz. The reception may be performed by the receiver 212, for example. Further, operation of the receiver 212 may in some aspects be controlled at least in part by the controller 224. In some aspects, the bandwidth is 1.25 MHz or is 0.625 MHz. The training field may comprise an STF and/or and LTF. The portion may be received over 32 tones in some aspects. The portion may correspond to a SIG field of the packet or to a first portion of a bifurcated SIG field.

Thereafter, at block 1404, a duration of the packet is determined based at least in part on the portion of the wireless signal. The determination may be performed by the processor 204, the signal detector 218, and/or the DSP 220, for example using the transform module 404 and the demodulator 406. Operation of one or more of these components may be downclocked by the controller 224 during the determination. The duration may be determined based on an indicator in the SIG field or a portion thereof.

Figure 15:
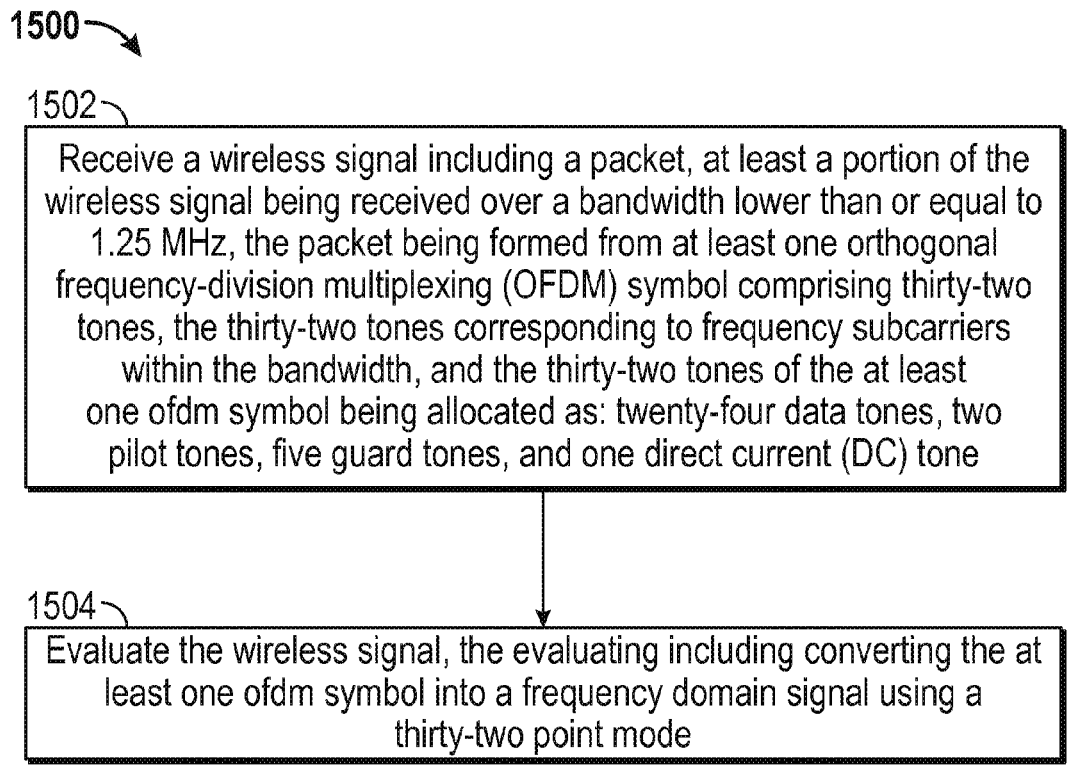
FIG. 15 is a flow chart of another exemplary method for receiving and evaluating a packet sent via a wireless signal.

FIG. 15 is a flow chart of another exemplary method 1500 for receiving and evaluating a packet sent via a wireless signal. The method 1500 may be used to receive any of the packets described above. The packets may be received at either the AP 104 or the STA 106 from another node in the wireless network 100. Although the method 1500 is described below with respect to elements of the wireless device 202, those having ordinary skill in the art will appreciate that other components may be used to implement one or more of the steps described herein.

At block 1502, a wireless signal including a packet is received. At least a portion of the wireless signal is received over a bandwidth lower than or equal to 1.25 MHz. In one aspect, the bandwidth may be lower than or equal to approximately 1.25 MHz where approximately 1.25 MHz may be within a range of 1.1 MHz to 1.4 MHz. In some implementations the wireless signal is received over a bandwidth equal to 1 MHz. In one aspect, the bandwidth may be equal to approximately 1 MHz where approximately 1 MHz may be within a range of 0.8 MHz to 1.2 MHz. The reception may be performed by the receiver 212, for example. Further, operation of the receiver 212 may in some aspects be controlled at least in part by the controller 224. The packet is formed from at least one orthogonal frequency-division multiplexing (OFDM) symbol comprising thirty-two tones, the thirty-two tones corresponding to frequency subcarriers within the bandwidth. The thirty-two tones of the at least one OFDM symbol are allocated as: twenty-four data tones, two pilot tones, five guard tones, and one direct current (DC) tone.

At block 1504, the wireless signal is evaluated where evaluating includes converting the at least one OFDM symbol into a frequency domain signal using a thirty-two point mode. The wireless signal may be evaluated at a processor 220. The processor 220 may include a transform module 404 configured to perform the conversion into the frequency domain using a thirty-two point mode. The evaluation may be performed by the processor 204, the signal detector 218, and/or the DSP 220, for example using the transform module 404 and the demodulator 406. Operation of one or more of these components may be downclocked by the controller 224 during the evaluation.

Figure 16:
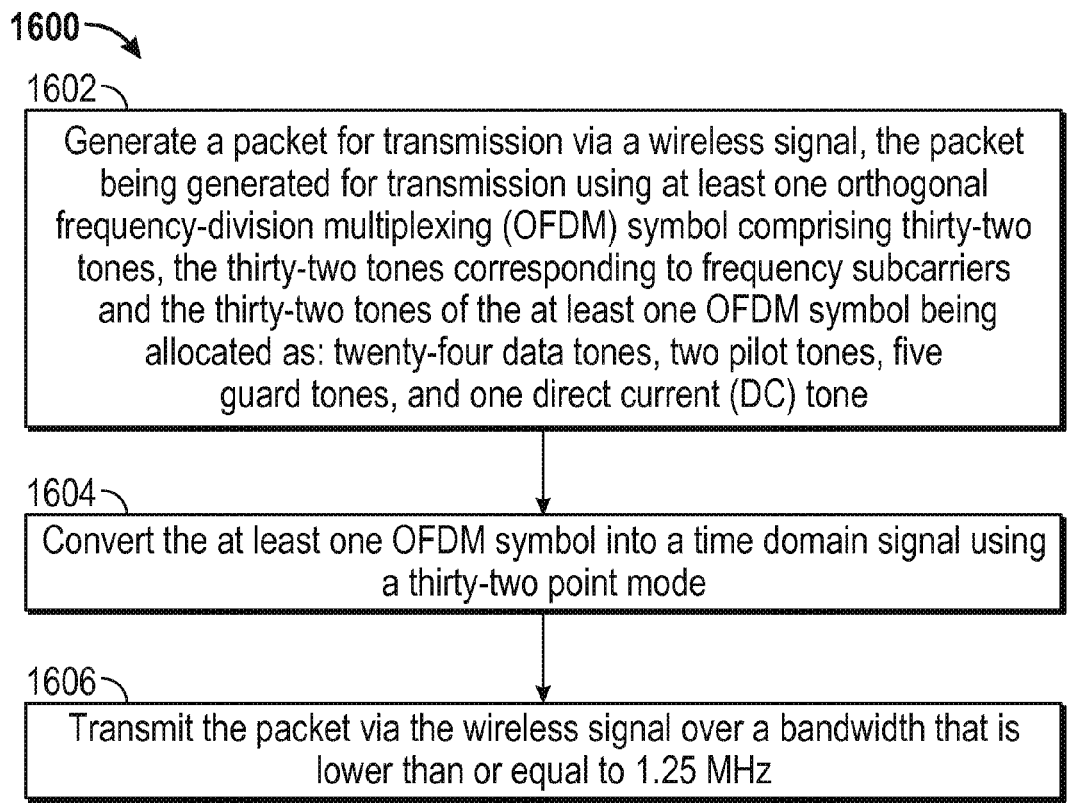
FIG. 16 is a flow chart of another exemplary method for generating and transmitting a packet via a wireless signal.

FIG. 16 is a flow chart of another exemplary method 1600 for generating and transmitting a packet via a wireless signal. The packets may be generated at either the AP 104 or the STA 106 and transmitted to another node in the wireless network 100. Although the method 1600 is described below with respect to elements of the wireless device 202, those having ordinary skill in the art will appreciate that other components may be used to implement one or more of the steps described herein.

At block 1602, a packet is generated for transmission via a wireless signal. The packet is generated for transmission using at least one orthogonal frequency-division multiplexing (OFDM) symbol comprising thirty-two tones, the thirty-two tones corresponding to frequency subcarriers. The thirty-two tones of the at least one OFDM symbol are allocated as: twenty-four data tones, two pilot tones, five guard tones, and one direct current (DC) tone. The generation may be performed by the processor 204 and/or the DSP 220, for example using the modulator 302 and the transform module 304. Operation of one or more of these components may be downclocked by the controller 224 during the generation.

Next, at block 1604, at least one OFDM symbol is converted into a time domain signal using a thirty-two point mode. A transform module 304 may be configured to operate according the thirty-two point mode to perform the conversion. At block 1606, the packet is transmitted via the wireless signal over a bandwidth that is lower than or equal to 1.25 MHz. In one aspect, the bandwidth may be lower than or equal to approximately 1.25 MHz where approximately 1.25 MHz may be within a range of 1.1 MHz to 1.4 MHz. In one implementation, the packet is transmitted via the wireless signal over a bandwidth that is equal to approximately 1 MHz. In one aspect, the bandwidth may be equal to approximately 1 MHz where approximately 1 MHz may be within a range of 0.8 MHz to 1.2 MHz. The transmission may be performed by the transmitter 210, for example. Further, operation of the transmitter 210 may in some aspects be controlled at least in part by the controller 224.

Figure 17:
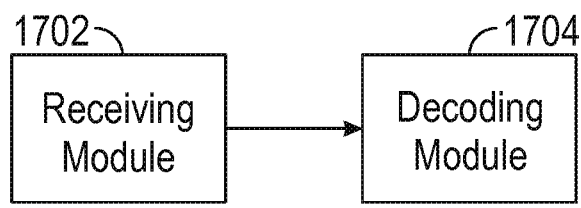
FIG. 17 is a functional block diagram of another exemplary wireless device that may be employed within the wireless communication system of FIG. 1.

FIG. 17 is a functional block diagram of yet another exemplary wireless device 1700 that may be employed within the wireless communication system 100. Those skilled in the art will appreciate that a wireless communication device 1700 may have more components than the wireless communication devices shown in FIGS. 2-6. The device 1700 comprises a receiving module 1702 for wirelessly receiving data. The receiving module 1702 may be configured to perform one or more of the functions discussed above with respect to the block 1502 illustrated in FIG. 15. The receiving module 1702 may correspond to the receiver 212, and may include the amplifier 401. In some cases, a means for receiving may include the receiving module 1702. The device 1700 further comprises a decoding module 1704 for evaluating a wireless signal. The decoding module 1704 may be configured to perform one or more of the functions discussed above with respect to the block 1504 illustrated in FIG. 15. In some cases a means for evaluating may include the decoding module 1704.

Figure 18:
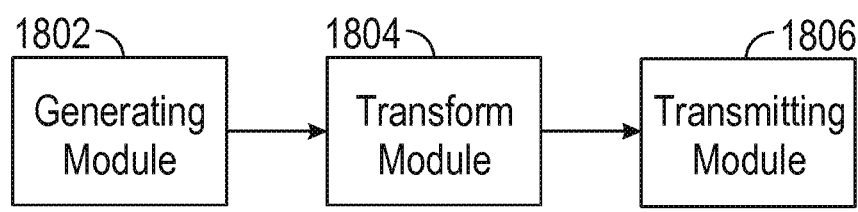
FIG. 18 is a functional block diagram of yet another exemplary wireless device that may be employed within the wireless communication system of FIG. 1.

FIG. 18 is a functional block diagram of another exemplary wireless device 1800 that may be employed within the wireless communication system 100. Those skilled in the art will appreciate that a wireless communication device 1800 may have more components than the wireless communication devices shown in FIGS. 2-6. The wireless communication device 1800 shown includes only those components useful for describing some prominent features of certain implementations. The device 1800 includes a generating module 1802 for encoding data for wireless transmission. In some cases a means for generating may include the generating module 1802. The generating module 1802 may be configured to perform one or more of the functions described above with respect to block 1602 of FIG. 16. The device 1800 may further comprise a transform module 1804 for converting a signal into a time domain. In some cases, a means for converting may include the transform module 1806. The transform module 1804 may be configured to perform one or more of the functions described above with respect to block 1604 of FIG. 16. The device 1800 further comprises a transmitting module 1806 for wirelessly transmitting the output from the generating module 1802. The transmitting module 1806 may be configured to perform one or more of the functions discussed above with respect to the block 1606 illustrated in FIG. 16. The transmitting module 1806 may correspond to the transmitter 210. In some cases, a means for transmitting may include the transmitting module 1806. The transmitting module 1806 may include a variety of components including, but not limited to, a constellation mapper, a modulator, an IDFT (inverse discrete time fourier transform module or IFFT 304 as described above with reference to FIG. 3), a digital to analog converter, an amplifier, an antenna, and other components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising: a receiver configured to receive a wireless signal comprising a packet over a bandwidth, wherein the packet comprises a preamble portion comprising a first signaling (SIG) field received over a first portion of the bandwidth, the first SIG field repeated at least once across a second portion of the bandwidth different from the first portion of the bandwidth, and wherein the preamble portion further comprises a second SIG field received over the bandwidth, wherein the first SIG field is formed from at least one orthogonal frequency-divisional multiplexing (OFDM) symbol, wherein the first portion of the bandwidth is 1 MHz, and wherein the bandwidth is 2 MHz; and a processor configured to evaluate the wireless signal including at least one of the first or second SIG fields.

2. The apparatus of claim 1, wherein a number of data bits in the second SIG field is greater than a number of data bits in the first SIG field portion.

3. The apparatus of claim 1, wherein the first SIG field includes information indicating a duration of the packet.

4. The apparatus of claim 1, wherein the processor comprises a transform module configured to evaluate the wireless signal over 32 tones, and wherein the transform module is configured to demodulate the first SIG field using 32 tones.

5. The apparatus of claim 1, wherein the bandwidth comprises one of 2 MHz, 4 MHz, 8 MHz or 16 MHz.

6. The apparatus of claim 1, wherein the first SIG field is received over one OFDM symbol.

7. The apparatus of claim 1, wherein the first SIG field and the second SIG field are collectively received over two OFDM symbols.

8. A method of wireless communication, comprising: receiving a wireless signal comprising a packet over a bandwidth, wherein the packet comprises a preamble portion comprising a first signaling (SIG) field received over a first portion of the bandwidth, the first SIG field repeated at least once across a second portion of the bandwidth different from the first portion of the bandwidth, and wherein the preamble portion further comprises a second SIG field received over the bandwidth, wherein the first SIG field is formed from at least one orthogonal frequency-divisional multiplexing (OFDM) symbol, wherein the first portion of the bandwidth is 1 MHz, and wherein the bandwidth is 2 MHz; and evaluating the wireless signal including at least one of the first or second SIG fields.

9. The method of claim 8, wherein a number of data bits in the second SIG field is greater than a number of data bits in the first SIG field portion.

10. The method of claim 8, wherein the first SIG field includes information indicating a duration of the packet.

11. The method of claim 8, wherein evaluating comprises evaluating over 32 tones, the evaluating further comprising demodulating the first SIG field using 32 tones.

12. The method of claim 8, wherein the bandwidth comprises one of 2 MHz, 4 MHz, 8 MHz or 16 MHz.

13. The method of claim 8, wherein the first SIG field is received over one OFDM symbol.

14. The method of claim 8, wherein the first SIG field and the second SIG field are collectively received over two OFDM symbols.

15. An apparatus for wireless communication, comprising: means for receiving a wireless signal comprising a packet over a bandwidth, wherein the packet comprises a preamble portion comprising a first signaling (SIG) field received over a first portion of the bandwidth, the first SIG field repeated at least once across a second portion of the bandwidth different from the first portion of the bandwidth, and wherein the preamble portion further comprises a second SIG field received over the bandwidth, wherein the first SIG field is formed from at least one orthogonal frequency-divisional multiplexing (OFDM) symbol, wherein the first portion of the bandwidth is 1 MHz, and wherein the bandwidth is 2 MHz; and means for evaluating the wireless signal including at least one of the first or second SIG fields.

16. The apparatus of claim 15, wherein a number of data bits in the second SIG field is greater than a number of data bits in the first SIG field portion.

17. The apparatus of claim 15, wherein the first SIG field includes information indicating a duration of the packet.

18. The apparatus of claim 15, wherein the means for evaluating comprises means for evaluating over 32 tones, the means for evaluating over 32 tones further comprising means for demodulating the first SIG field using 32 tones.

19. The apparatus of claim 15, wherein the bandwidth comprises one of 2 MHz, 4 MHz, 8 MHz or 16 MHz.

20. The apparatus of claim 15, wherein the first SIG field is received over one OFDM symbol.

21. The apparatus of claim 15, wherein the first SIG field and the second SIG field are collectively received over two OFDM symbols.

22. A computer program product comprising a non-transitory computer readable medium encoded thereon with instructions that when executed cause a wireless communications apparatus to perform a method of wireless communication, said method comprising: receiving a wireless signal comprising a packet over a bandwidth, wherein the packet comprises a preamble portion comprising a first signaling (SIG) field received over a first portion of the bandwidth, the first SIG field repeated at least once across a second portion of the bandwidth different from the first portion of the bandwidth, and wherein the preamble portion further comprises a second SIG field received over the bandwidth, wherein the first SIG field is formed from at least one orthogonal frequency-divisional multiplexing (OFDM) symbol, wherein the first portion of the bandwidth is 1 MHz, and wherein the bandwidth is 2 MHz; and evaluating the wireless signal including at least one of the first or second SIG fields.

23. The computer program product of claim 22, wherein a number of data bits in the second SIG field is greater than a number of data bits in the first SIG field portion.

24. The computer program product of claim 22, wherein the first SIG field includes information indicating a duration of the packet.

25. The computer program product of claim 22, wherein evaluating comprises evaluating over 32 tones, the evaluating further comprising demodulating the first SIG field using 32 tones.

26. The computer program product of claim 22, wherein the bandwidth comprises one of 2 MHz, 4 MHz, 8 MHz or 16 MHz.

27. The computer program product of claim 22, wherein the first SIG field is received over one OFDM symbol.

28. The computer program product of claim 22, wherein the first SIG field and the second SIG field are collectively received over two OFDM symbols.

29. An apparatus for wireless communication, comprising: a processor configured to generate a packet for transmission via a wireless signal over a bandwidth, wherein the packet comprises a preamble portion comprising a first signaling (SIG) field generated for transmission over a first portion of the bandwidth, the first SIG field repeated at least once across a second portion of the bandwidth different from the first portion of the bandwidth, and wherein the preamble portion further comprises a second SIG field generated for transmission over the bandwidth, wherein the first SIG field is generated for transmission using at least one orthogonal frequency-divisional multiplexing (OFDM) symbol, wherein the first portion of the bandwidth is 1 MHz, and wherein the bandwidth is 2 MHz; and a transmitter configured to transmit the packet via the wireless signal over the bandwidth.

30. The apparatus of claim 29, wherein a number of data bits in the second SIG field is greater than a number of data bits in the first SIG field portion.

31. The apparatus of claim 29, wherein the first SIG field includes information indicating a duration of the packet.

32. The apparatus of claim 29, wherein the processor is configured to generate the first SIG field to be compatible for demodulating using a transform module configured to demodulate over 32 tones.

33. The apparatus of claim 29, wherein the bandwidth comprises one of 2 MHz, 4 MHz, 8 MHz or 16 MHz.

34. The apparatus of claim 29, wherein the first SIG field is generated for transmission over one OFDM symbol.

35. The apparatus of claim 29, wherein the first SIG field and the second SIG field are collectively generated for transmission over two OFDM symbols.

36. A method of wireless communication, comprising: generating a packet for transmission via a wireless signal over a bandwidth, wherein the packet comprises a preamble portion comprising a first signaling (SIG) field generated for transmission over a first portion of the bandwidth, the first SIG field repeated at least once across a second portion of the bandwidth different from the first portion of the bandwidth, and wherein the preamble portion further comprises a second SIG field generated for transmission over the bandwidth, wherein the first SIG field is generated for transmission using at least one orthogonal frequency-divisional multiplexing (OFDM) symbol, wherein the first portion of the bandwidth is 1 MHz, and wherein the bandwidth is 2 MHz; and transmitting the packet via the wireless signal over the bandwidth.

37. The method of claim 36, wherein a number of data bits in the second SIG field is greater than a number of data bits in the first SIG field portion.

38. The method of claim 36, wherein the first SIG field includes information indicating a duration of the packet.

39. The method of claim 36, wherein generating the packet further comprises generating the first SIG field to be compatible for demodulating using a transform module configured to demodulate over 32 tones.

40. The method of claim 36, wherein the bandwidth comprises one of 2 MHz, 4 MHz, 8 MHz or 16 MHz.

41. The method of claim 36, wherein the first SIG field is generated for transmission over one OFDM symbol.

42. The method of claim 36, wherein the first SIG field and the second SIG field are collectively generated for transmission over two OFDM symbols.

43. An apparatus for wireless communication, comprising: means for generating a packet for transmission via a wireless signal over a bandwidth, wherein the packet comprises a preamble portion comprising a first signaling (SIG) field generated for transmission over a first portion of the bandwidth, the first SIG field repeated at least once across a second portion of the bandwidth different from the first portion of the bandwidth, and wherein the preamble portion further comprises a second SIG field generated for transmission over the bandwidth, wherein the first SIG field is generated for transmission using at least one orthogonal frequency-divisional multiplexing (OFDM) symbol, wherein the first portion of the bandwidth is 1 MHz, and wherein the bandwidth is 2 MHz; and means for transmitting the packet via the wireless signal over the bandwidth.

44. The apparatus of claim 43, wherein a number of data bits in the second SIG field is greater than a number of data bits in the first SIG field portion.

45. The apparatus of claim 43, wherein the first SIG field includes information indicating a duration of the packet.

46. The apparatus of claim 43, wherein the means for generating the packet further comprises means for generating the first SIG field to be compatible for demodulating using a transform module configured to demodulate over 32 tones.

47. The apparatus of claim 43, wherein the bandwidth comprises one of 2 MHz, 4 MHz, 8 MHz or 16 MHz.

48. The apparatus of claim 43, wherein the first SIG field is generated for transmission over one OFDM symbol.

49. The method of claim 43, wherein the first SIG field and the second SIG field are collectively generated for transmission over two OFDM symbols.

50. A computer program product comprising a non-transitory computer readable medium encoded thereon with instructions that when executed cause a wireless communications apparatus to perform a method of wireless communication, said method comprising: generating a packet for transmission via a wireless signal over a bandwidth, wherein the packet comprises a preamble portion comprising a first signaling (SIG) field generated for transmission over a first portion of the bandwidth, the first SIG field repeated at least once across a second portion of the bandwidth different from the first portion of the bandwidth, and wherein the preamble portion further comprises a second SIG field generated for transmission over the bandwidth, wherein the first SIG field is generated for transmission using at least one orthogonal frequency- divisional multiplexing (OFDM) symbol, wherein the first portion of the bandwidth is 1 MHz, and wherein the bandwidth is 2 MHz; and transmitting the packet via the wireless signal over the bandwidth.

51. The computer program product of claim 50, wherein a number of data bits in the second SIG field is greater than a number of data bits in the first SIG field portion.

52. The computer program product of claim 50, wherein the first SIG field includes information indicating a duration of the packet.

53. The computer program product of claim 50, wherein generating the packet further comprises generating the first SIG field to be compatible for demodulating using a transform module configured to demodulate over 32 tones.

54. The computer program product of claim 50, wherein the bandwidth comprises one of 2 MHz, 4 MHz, 8 MHz or 16 MHz.

55. The computer program product of claim 50, wherein the first SIG field is generated for transmission over one OFDM symbol.

56. The computer program product of claim 50, wherein the first SIG field and the second SIG field are collectively generated for transmission over two OFDM symbols.

* * * * *